(12) United States Patent
Almy

(10) Patent No.: US 9,853,594 B2
(45) Date of Patent: *Dec. 26, 2017

(54) PHOTOVOLTAIC MOUNTING SYSTEM WITH CHEMICAL FLASHING

(71) Applicant: SolarCity Corporation, San Mateo, CA (US)

(72) Inventor: Charles Almy, Berkeley, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,346

(22) Filed: Feb. 23, 2016

(65) Prior Publication Data

US 2016/0248369 A1 Aug. 25, 2016

Related U.S. Application Data

(60) Provisional application No. 62/260,178, filed on Nov. 25, 2015, provisional application No. 62/120,841, filed on Feb. 25, 2015.

(51) Int. Cl.
*E04D 13/18* (2014.01)
*H02S 20/23* (2014.01)
*F24J 2/52* (2006.01)

(52) U.S. Cl.
CPC ............. *H02S 20/23* (2014.12); *F24J 2/5245* (2013.01); *F24J 2/5258* (2013.01);
(Continued)

(58) Field of Classification Search
CPC ....................................................... H02S 20/23
(Continued)

(56) References Cited

U.S. PATENT DOCUMENTS 2,092,341 A 7/1937 De Vries
2,666,354 A 6/1950 Dim et al.
(Continued)

FOREIGN PATENT DOCUMENTS

CN 202796998 U 3/2013
EP 0276708 A1 8/1988
(Continued)

OTHER PUBLICATIONS

International Search Report dated Jun. 10, 2016 for International Patent Application No. PCT/US2016/019630, 7 pages.
(Continued)

*Primary Examiner* — Basil Katcheves
(74) *Attorney, Agent, or Firm* — Kilpatrick Townsend & Stockton LLP

(57) ABSTRACT

Photovoltaic mounting systems that form chemical flashings are provided herein. Such sealant injection systems provide directional control and containment of sealant flow to form a chemical flashing that improves sealing of roof penetrations. Such systems can include a base assembly adapted to mount to a roof surface and support a mounting bracket having a photovoltaic module coupling device. The base assembly can include a sealant guide, a compressing plate and a sealant cartridge held between the guide and compressing plate by one or more coupling features of the guide. The coupling features can include a first set of features, such as a series of tabs, that facilitate coupling between the guide and the compressing plate. The base assembly can further include a base that releasably couples to the sealant guide by a second set of coupling features. Methods of mounting such base assemblies on roof surfaces are also provided.

16 Claims, 23 Drawing Sheets

(52) U.S. Cl.
CPC ........ *F24J 2002/5294* (2013.01); *Y02B 10/12* (2013.01); *Y02B 10/20* (2013.01); *Y02E 10/47* (2013.01)

(58) Field of Classification Search
USPC .......... 52/173.3, 58, 704, 745.21; 405/259.1
See application file for complete search history.

(56) References Cited

U.S. PATENT DOCUMENTS

| | | | |
|---|---|---|---|
| 3,504,498 A * | 4/1970 | Triplett | E21D 21/0093 405/259.3 |
| 3,940,941 A * | 3/1976 | Libert | F16B 35/04 405/259.6 |
| 4,119,083 A | 10/1978 | Heyen et al. | |
| 4,372,708 A * | 2/1983 | Bower, Jr. | E21D 20/025 206/219 |
| 4,407,477 A | 10/1983 | Backlund et al. | |
| 4,425,065 A * | 1/1984 | Sweeney | F16B 13/143 156/92 |
| 4,472,088 A * | 9/1984 | Martin | E21D 21/0006 405/259.1 |
| 4,531,861 A * | 7/1985 | Kash | F16B 5/0275 405/259.1 |
| 4,555,206 A | 11/1985 | Sweeney | |
| 4,619,094 A | 10/1986 | Yang | |
| 4,693,652 A | 9/1987 | Sweeney | |
| 4,830,558 A * | 5/1989 | Sweeney | F16B 47/003 248/205.3 |
| 4,896,416 A * | 1/1990 | Cranko | F16B 13/0841 248/231.9 |
| 5,281,065 A | 1/1994 | Wu | |
| 5,315,800 A * | 5/1994 | Weber | E04B 1/4157 411/82 |
| 5,513,075 A | 4/1996 | Capper | |
| 5,873,201 A | 2/1999 | Fey | |
| 5,937,603 A | 8/1999 | Zeidler | |
| 6,007,043 A | 12/1999 | Sperber | |
| 6,017,176 A | 1/2000 | Marui | |
| 6,035,595 A * | 3/2000 | Anderson | E04F 13/045 411/258 |
| 6,536,729 B1 | 3/2003 | Haddock | |
| 7,963,726 B2 * | 6/2011 | Boot | E21D 21/0006 405/259.1 |
| 8,011,868 B2 | 9/2011 | Stephan | |
| 8,151,522 B2 | 4/2012 | Stearns et al. | |
| 8,557,081 B2 | 10/2013 | Sha et al. | |
| 8,615,954 B1 | 12/2013 | Graboski | |
| 8,733,718 B2 | 5/2014 | Corsi | |
| 8,756,871 B1 | 6/2014 | Johnson | |
| 8,756,881 B2 | 6/2014 | West et al. | |
| 8,875,453 B2 * | 11/2014 | Kanczuzewski | F16M 13/02 136/244 |
| 8,920,088 B1 | 12/2014 | Garvin | |
| 8,931,989 B2 * | 1/2015 | Stephan | F16B 43/001 411/371.1 |
| 2007/0272234 A1 * | 11/2007 | Allen | F24J 2/16 126/704 |
| 2011/0067693 A1 | 3/2011 | Paull | |
| 2011/0126888 A1 | 6/2011 | Naitoh et al. | |
| 2012/0144760 A1 | 6/2012 | Schaefer et al. | |
| 2012/0186630 A1 * | 7/2012 | Jenkins | E04D 13/158 136/251 |
| 2012/0279560 A1 | 11/2012 | Sumida et al. | |
| 2013/0020455 A1 | 1/2013 | Sizelove et al. | |
| 2013/0133270 A1 * | 5/2013 | West | E04B 1/38 52/58 |
| 2013/0167455 A1 | 7/2013 | Jenkins et al. | |
| 2013/0291479 A1 * | 11/2013 | Schaefer | F24J 2/5245 52/745.21 |
| 2013/0299655 A1 | 11/2013 | Sader | |
| 2014/0000584 A1 | 1/2014 | Raucher et al. | |
| 2014/0060625 A1 | 3/2014 | Beuke et al. | |
| 2014/0130847 A1 * | 5/2014 | West | F24J 2/5211 136/251 |
| 2014/0130957 A1 | 5/2014 | Verdier et al. | |
| 2014/0175244 A1 | 6/2014 | West et al. | |
| 2014/0196769 A1 * | 7/2014 | Schoop | H01L 31/048 136/251 |
| 2015/0107185 A1 | 4/2015 | Kose et al. | |
| 2015/0204062 A1 | 7/2015 | Traxler | |
| 2015/0218824 A1 * | 8/2015 | Schaefer | E04C 3/06 52/704 |
| 2015/0280639 A1 * | 10/2015 | Atchley | H02S 20/23 248/237 |
| 2016/0142006 A1 * | 5/2016 | Meine | H02S 20/23 174/535 |

FOREIGN PATENT DOCUMENTS

| | | |
|---|---|---|
| EP | 2348263 A3 | 12/2014 |
| GB | 442832 A | 2/1936 |
| GB | 2 454 368 A | 5/2009 |
| JP | 2008274591 A | 11/2008 |
| JP | 2014 088733 A | 5/2014 |
| JP | 5555364 B1 | 7/2014 |
| WO | 2008/156578 A1 | 12/2008 |

OTHER PUBLICATIONS

Written Opinion dated Jun. 10, 2016 for International Patent Application No. PCT/US2016/019630, 6 pages.

"S-5! The Right Way" CorruBracket Brochure, Metal Roof Innovations, Ltd., Colorado Springs, CO, 2010, retrieved from the internet on Jan. 26, 2016 at: www.sunsourceproducts.com/catalog/productdetail.asp?cat=07&part=S5-COR, 2 pages.

* cited by examiner

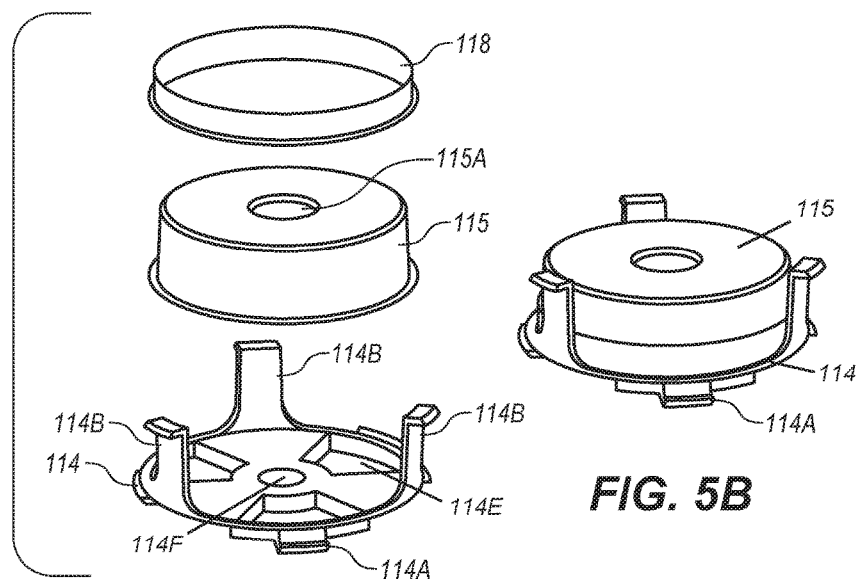
FIG. 5A
FIG. 5B
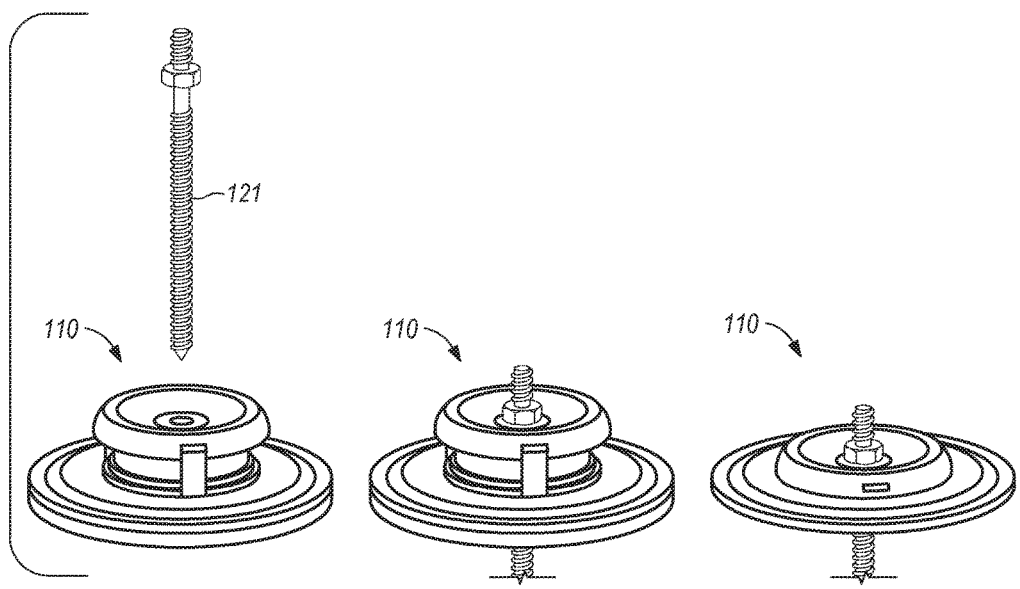
FIG. 6A   FIG. 6B   FIG. 6C

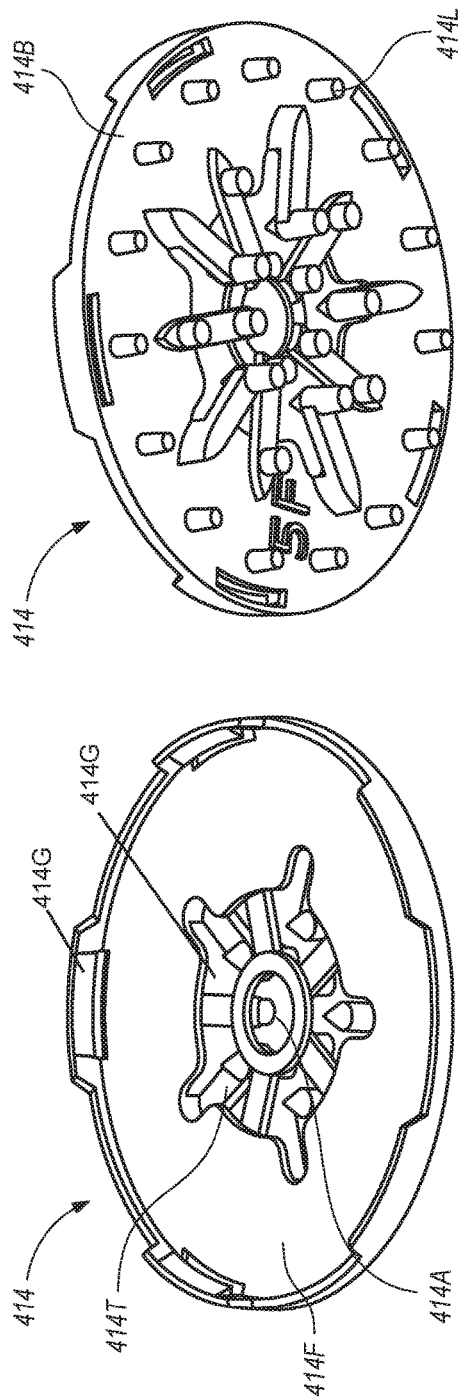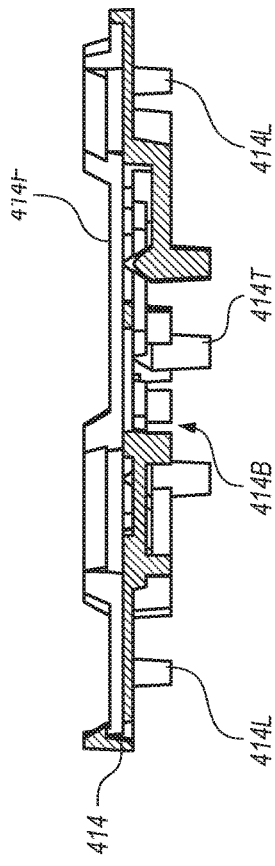
FIG. 25A
FIG. 25B
FIG. 26

PHOTOVOLTAIC MOUNTING SYSTEM WITH CHEMICAL FLASHING

CROSS-REFERENCE TO RELATED APPLICATIONS

This claims the benefit of priority of U.S. Provisional Patent Application No. 62/260,178 filed on Nov. 25, 2015 and U.S. Provisional Patent Application No. 62/120,841 filed on Feb. 25, 2015; each of which is incorporated herein by reference in its entirety.

This is related to Non-Provisional patent application Ser. No. 14/949,820 filed on Nov. 23, 2015 and Non-Provisional patent application Ser. No. 15/007,154 filed on Jan. 26, 2016; each of which is incorporated herein by reference in its entirety for all purposes.

FIELD OF THE INVENTION

This invention relates to mounting system for photovoltaic modules or so-called "solar panels."

SUMMARY OF THE INVENTION

The present invention relates to photovoltaic mounting systems, and in particular mounting systems adapted to form a chemical flashing about any roof penetrations associated with the mounting system. In various embodiments, the system includes a cartridge of sealant material that provides a chemical flashing when mounted on a roof surface. In various embodiments, the cartridge of sealant material is discharged between the photovoltaic mounting system and roof surface by the torqueing down of a mechanical fastener connecting the mounting system to the roof surface. In various embodiments, the mechanical fastener can be a lag bolt, while in other embodiments, the mechanical fastener can a hanger bolt. In various embodiments, the system can further include a compressing member or plate that presses against a base assembly to compress the sealant cartridge, which forces the sealant through apertures defined in the base assembly to form a chemical flashing on the roof surface. The chemical flashing is formed to provide a water resistant seal around the mechanical fastener. In various embodiments, the compressing plate can be a rigid disk, although in various other embodiments, the compressing plate can be formed in different shapes. In various embodiments, the system can include a photovoltaic module mounting bracket having a photovoltaic module coupling device that is attached to the base assembly. In some embodiments, the module mounting bracket is attached to the base assembly via a nut and the top threaded portion of the hanger bolt attaches the base assembly to the roof surface. The base assembly can be formed in a circular shape resembling a puck, although it is appreciated that the base assembly can be formed in various non-circular shapes (e.g. oval, square, rectangular) as needed for a particular application. In one aspect, the invention relates to a photovoltaic mounting system for mounting on a roof surface that includes a base assembly adapted to couple with and support a mounting bracket supporting a photovoltaic module coupling device. The base assembly includes a through-hole for insertion of a mechanical fastener. In various embodiments, the base assembly includes a sealant guide, a compressing member or plate, and a sealant cartridge containing a flowable sealant sealed. In various embodiments, the sealant cartridge is held between the sealant guide and the compressing member within the base assembly without requiring any additional separate coupling members to maintain the assembly. One or more of the sealant guide, the base and the compressing plate can include one or more coupling features for releasably securing the components of the base assembly together without requiring any additional separate coupling member, such as a mechanical fastener or other fastening member.

In various embodiments, the base assembly includes a sealant guide having a first set of coupling features that releasably couple with the sealant cartridge or the compressing plate to hold the base assembly together via the one or more coupling features. The first of coupling features can include multiple tabs extending from or near an outer periphery of the sealant guide towards the compressing plate that are adapted to releasably engage with an outer periphery of the compressing plate to maintain the sealant cartridge between the sealant guide and the compressing plate. The compressing plate can include one or more openings along the periphery thereof that are arranged to receive a distal retention feature on each of the plurality of tabs. In various embodiments, each of the plurality of tabs of the first set includes a release feature on a distal end thereof to facilitate manual release of the compressing member by pressing against the release features of the plurality of tabs.

In various embodiments, the base assembly includes a base adapted to releasably couple to the sealant guide by a second set of coupling features of the sealant guide. The sealant guide includes a central hole for passage of the mechanical fastener and a series of apertures distributed radially about the central hole to facilitate uniform distribution of flowable sealant around any roof surface penetration through which the mechanical fastener extends when mounted on the roof surface. The base also includes a central hole for passage of the mechanical fastener and multiple openings distributed about the central hole that are aligned with the plurality of apertures in the sealant guide when mounted on the roof surface to allow flow of sealant therethrough. In various embodiments, the second set of coupling features comprises a plurality of tabs extending towards the base, each of the tabs having a distal retention feature adapted to engage an edge of the multiple openings in the base. In various embodiments, the retention feature is defined as an outwardly extending wedge shaped portion positioned to facilitate lateral deflection of the tabs when the guide is pressed against the base so as to provide a snap-fit coupling between the guide and the base. In various embodiments, the base has an underside recess on a roof-facing side that defines a space between the base and the roof when mounted thereon for flowable sealant to fill so as to form the chemical flashing. In addition, a sealant ring can be used to define and seal a space between the base and roof surface in which the chemical flashing is formed.

In another aspect, the photovoltaic mounting system includes a base assembly having a sealant cartridge with a breakable seal on a roof facing side to facilitate directionally controlled release of flowable sealant through the seal upon fastening of the base assembly onto the roof. The base assembly can further include a sealant guide for supporting that sealant cartridge and securing the sealant cartridge to a base or the guide can be integrated with the base. The sealant guide can include one or more puncture tubes with one or barbs directed towards the breakable seal to facilitate breaking of the seal upon fastening of the base assembly to the roof surface.

In various embodiments, the base assembly includes a compressing member disposed atop a collapsible sealant cartridge. The compressing plate can be defined as a compressing plate having a planar surface for engaging and pressing against the sealant cartridge. The top of the compressing plate facing away from the sealant cartridge can be defined as a convex outer surface face to inhibit accumulation of rain and/or debris when mounted on the roof surface. Typically, the compressing plate is defined has a circular shape, although it is appreciated that the compressing plate can be formed in various other non-circular shape. In various other embodiments, the compressing plate is defined as a bell-type shape having an outer periphery that extends further below an interior portion that engages against the top of the sealant cartridge. This bell-type shape allows the outer periphery of the compressing plate to seal against the roof and/or a sealant ring on the roof so as to enclose the compressed sealant reservoir therein and contain any excess sealant extruded when the assembly is mounted onto the roof surface.

In various embodiments, a photovoltaic mounting system for mounting to a roof surface includes a base assembly adapted to couple with and support a mounting bracket supporting a photovoltaic module coupling device. The base assembly includes a through-hole for insertion of a mechanical fastener, such as a lag bolt or a hangar bolt. In various embodiments, the base assembly includes a base, a compressing member, a sealant guide having a first set of coupling features adapted to releasably couple with the compressing member and a sealant reservoir containing a flowable sealant sealed. The sealant cartridge is held between the sealant guide and the compressing member by the first set of coupling features. The first set of coupling features include a plurality of protrusions fittingly received within corresponding openings in the compressing member. In various embodiments, each of the tabs of the first set includes a release feature on a distal end to facilitate manual release of the compressing member by pressing against the release features of the plurality of tabs.

In various embodiments, the photovoltaic mounting system includes a base assembly having an integrated sealant guide and base. In some embodiments, the integrated sealant guide base can further include an integrated sealant reservoir. In other embodiments, the sealant guide base can be used with a removable sealant cartridge. In various embodiments, the sealant guide, sealant reservoir and base are integrated within a single component having ribs or gussets that provide sufficient support to maintain sealed sealant reservoir yet allow directionally controlled collapse of the reservoir when the base assembly is fastened to the roof surface.

In various embodiments, the photovoltaic mounting system includes a base assembly with a sealant cartridge and a reinforcement ring disposed about the cartridge. The reinforcing ring is adapted to provide reinforcement against blow-out of sealant through a side-wall of the sealant cartridge. In various embodiments, the reinforcing ring is adapted to fittingly receive the sealant cartridge and extends above the roof surface a lower height than the cartridge so as to allow compression of the sealant cartridge during installation.

In various embodiments, the photovoltaic mounting system includes a photovoltaic module coupling device, a mounting bracket supporting the photovoltaic module coupling device, and a base assembly releasably coupled to the mounting bracket and having a through-hole for insertion of a mechanical fastener. The base assembly can include a sealant guide, a compressing member, and a sealant cartridge containing a flowable sealant sealed. In various embodiments, the sealant cartridge is held between the sealant guide and the compressing member within the base assembly without requiring any additional separate coupling members to maintain the assembly.

BRIEF DESCRIPTION OF THE DRAWINGS

FIGS. 5A and 5B illustrate an exploded view and an exploded view, respectively, of a base assembly of a photovoltaic mounting system according to an exemplary embodiment.

FIGS. 6A-6C illustrate sequential views showing installation of a base assembly of a photovoltaic mounting system according to an exemplary embodiment.

FIGS. 25A and 25B illustrate perspective views of the top-side and the bottom, roof-facing side, respectively, of an integrated guide base of the photovoltaic mounting system of FIG. 22.

FIG. 26 illustrates a cross-sectional side of the integrated guide base of the photovoltaic mounting system of FIG. 22.

DETAILED DESCRIPTION

The following description is intended to convey a thorough understanding of the embodiments described by providing a number of specific embodiments and details involving PV mounting hardware for shingled roofs. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
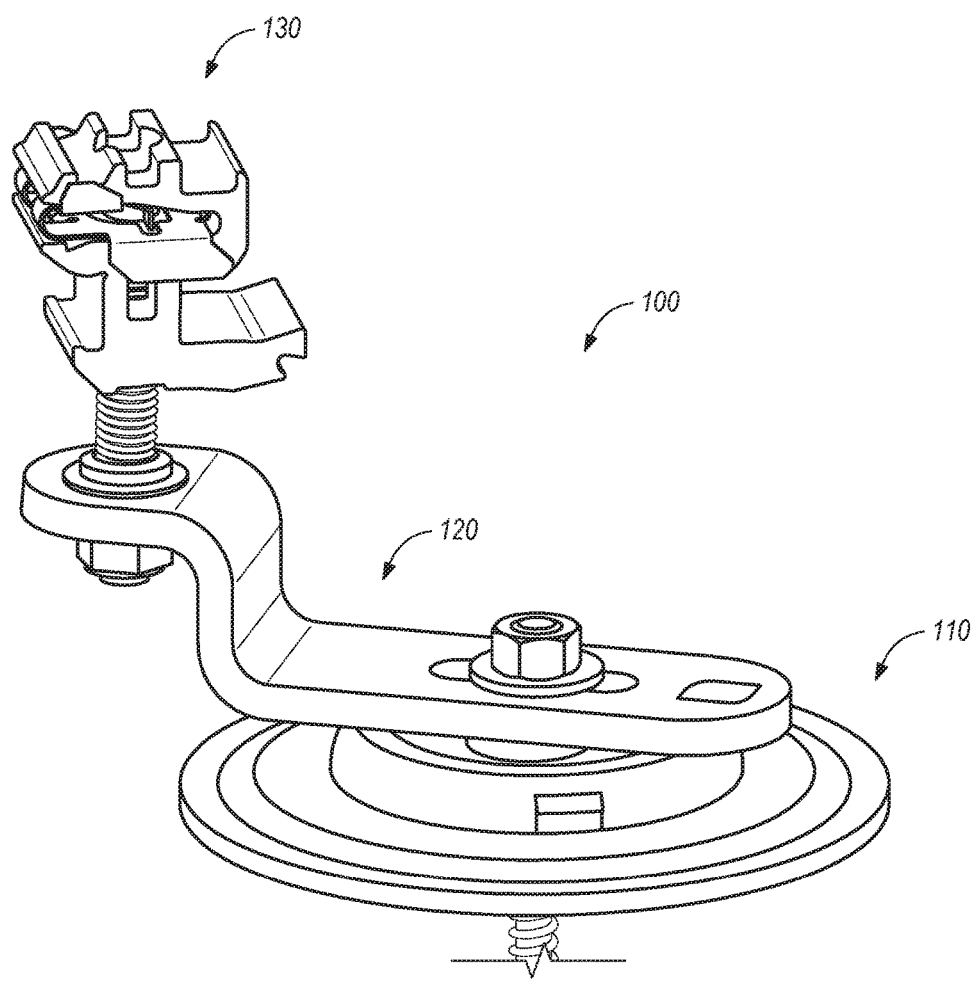
FIGS. 1 and 2 illustrate an assembled view and an exploded view of a photovoltaic mounting system adapted to form a chemical flashing according to an exemplary embodiment.
Figure 2:
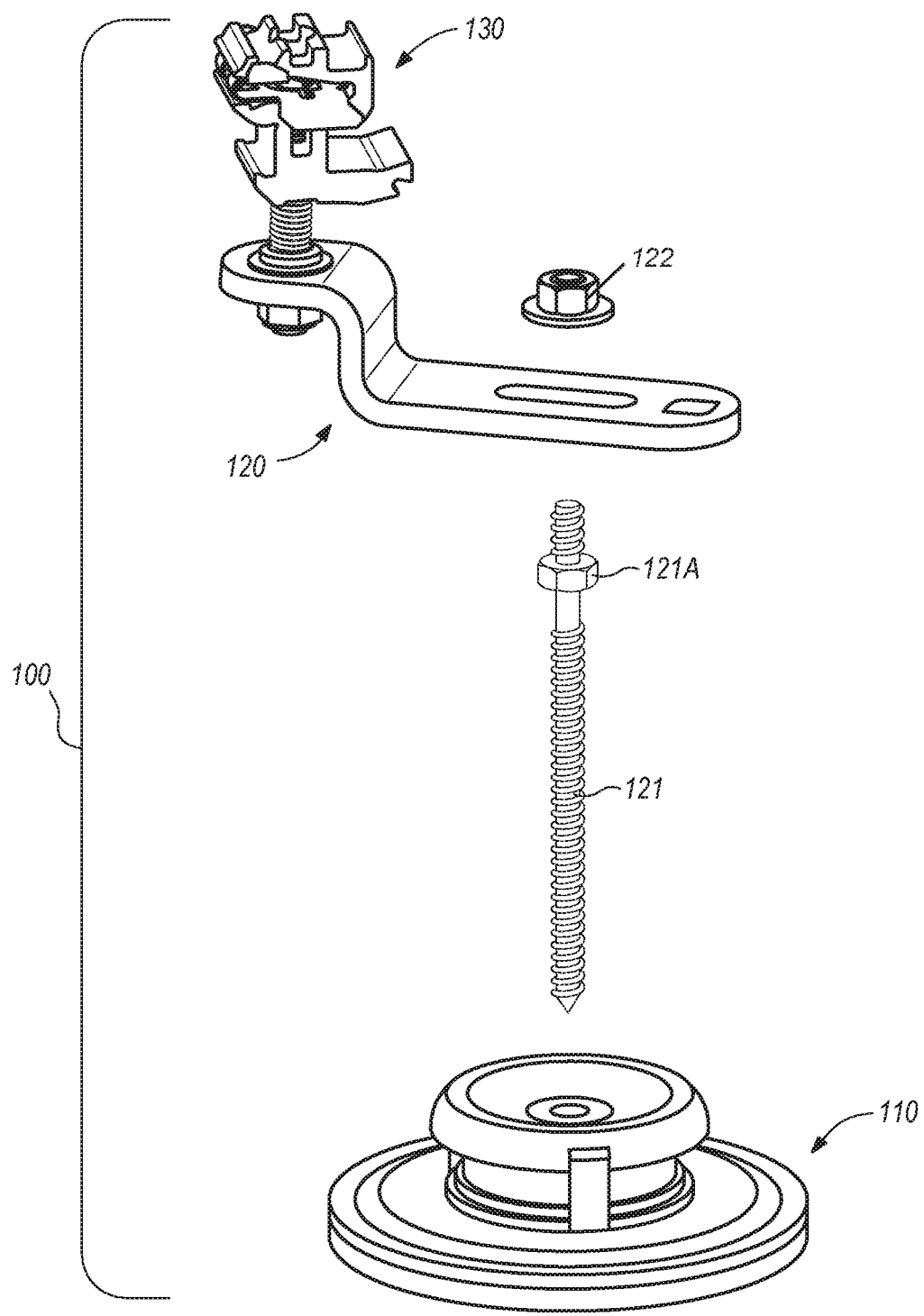

Referring now to FIGS. 1-8, these Figures show various views of a photovoltaic mounting system according to various embodiments of the invention. As shown in FIG. 1, mounting system 100 includes a base portion 110, mounting bracket 120 and photovoltaic module coupling device 130. As can be seen in the exploded view of FIG. 2, a fastener, such as hanger bolt 121, is used to fasten mounting bracket 120 to base portion 110 and to mount base portion 110 to the roof surface. Bolt head 121a engages a top surface of base portion 110 to mount onto the roof surface and mounting bracket 120 is secured to base portion 110 by nut 112 threaded onto the upper threaded region of hanger bolt 121.

Figure 3A:
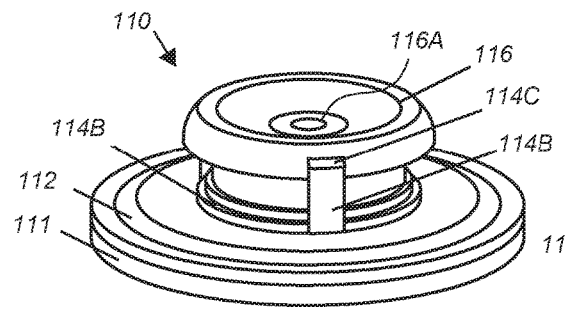
FIGS. 3A-3C illustrate several views of a base assembly of a photovoltaic mounting system according to an exemplary embodiment.
Figure 3C:
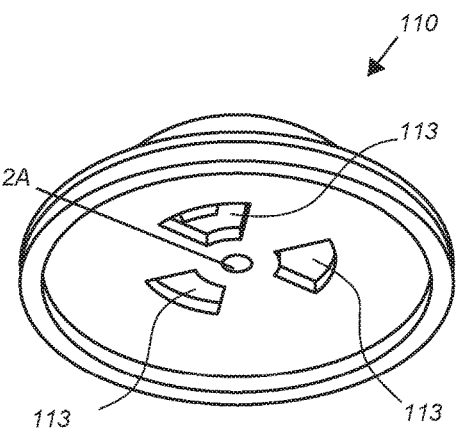
Figure 3B:
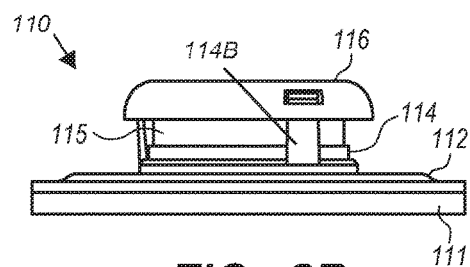
Figure 4:
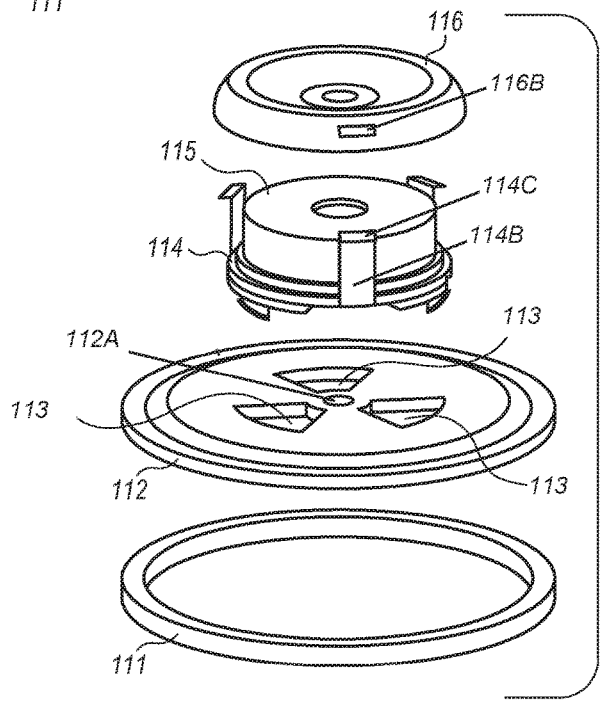
FIG. 4 illustrates an exploded view of a base assembly of a photovoltaic mounting system according to an exemplary embodiment.

As shown in FIG. 3A-3C, base portion 110 includes sealant cartridge 115 that sits between compressing plate 116 and base 112. Compressing plate 116 may take the form of a bell housing or simply be a plate or can be formed in any suitable shape for pressing against cartridge 115 so as to release the flowable sealant thereby forming the chemical flashing. Base 112 can be formed in a circular, puck shape, although it is appreciated that base 112 can also be formed in various other non-circular shapes as well. In some embodiments, base 112 is formed of a durable, rigid, corrosion resistant material, for example a metal alloy, such as steel, aluminum or hard plastic. Sealant cartridge 115 contains a flowable sealant that is released upon mounting of base assembly 110 to form the chemical flashing. In various embodiments, base 112 includes a recess on its bottom, roof-facing side, that circumscribes its perimeter and that is dimensioned to receive the top of sealant ring 111 to keep sealant material captured under base portion 110 when the assembly is attached to a roof or other support surface. Sealant ring 111 can be attached to base 112 by any suitable means, for example a pressure-sensitive adhesive. As shown in FIGS. 3A-4, base portion 110 can be defined as a stacked assembly, although it is appreciated that in various other embodiments some or all of the components of the assembly can be integrated.

As shown in FIGS. 3A-3C and 4, base 112 can include center hole 113 for passage of a mechanical fastener and apertures 113A to allow extrusion of the flowable sealant therethrough. Apertures 113A may be distributed around center hole 113 to allow for even distribution of sealant material under base 112. In this embodiment, apertures 113A are distributed radially about center hole 113 to provide more uniform distribution of sealant about the roof penetration that the fastener extends through. While three apertures are shown here, each defined in a trapezoidal-shape, it is appreciated that the apertures could be formed in various differing shapes and numbers. For example, apertures 113A can be formed also as circular holes or could be formed as a single opening extending partly or entirely about center hole 113.

As can be seen in FIG. 4, cartridge 115 comprises a cylindrical-shaped structure with a center through-hole 115A. Cartridge 115 can be formed of any suitable material, for example plastic, that can contain a flowable sealant in a sealed state. In various embodiments, the housing of cartridge 115 can be formed, partly or entirely, of a material that can be crushed or collapsed so as to allow release of the flowable sealant upon mounting of base portion 110 to the roof. In various embodiments, one side of cartridge 115 facing towards base 112 may be covered with foil or other material that is strong enough to provide an airtight seal to prevent the sealant form curing but breakable enough to easily penetrated or ruptured during installation to release the sealant. A plastic bracket such as sealant carrier or guide 114 may surround cartridge 115, keep center-hole 115A of cartridge 115 over center opening 113 in base 112, and also function as mechanical fastener to connect cartridge 115 and compressing plate 116 to base 112 to form a single assembly.

In various embodiments, sealant guide 114 includes one or more coupling features that act as mechanical fasteners to couple guide 114 to one or both of compressing plate 116 and base 112 with sealant cartridge 115 secured therebetween. In these embodiments, the one or more coupling features are defined as one or more tabs, typically a series of tabs distributed about the periphery of guide 114. As can be in seen in FIG. 4, guide 114 include multiple tabs 114B that extend upwards toward compressing plate 116. Each tab can include a retention feature 14C on a distal end thereof. Retention feature 14C can be defined as an inwardly bent or curved end adapted to engage a top, outer surface of compressing plate 116 sufficiently to couple guide 114 with compressing plate 116. In some embodiments, tabs 114B are adapted to receive and fit over an outer periphery of compressing plate 116 and engage an outer surface, such as shown in FIG. 3A. Tabs 114B are formed of a material with sufficient rigidity and strength to resiliently deflect to receive compressing plate 116 and apply enough tension to securely couple compressing plate 116 to guide 114 with sealant cartridge 115 held in between. In some embodiments, tabs 114B are adapted to interface with corresponding retention features 116B within compressing plate 116. In this embodiment, the corresponding retention features 116B are defined as square openings dimensioned to receive the distal retention feature of tabs 114B. It is appreciated that the assembly can be designed so that tabs 114B interface with the corresponding retention features 116B from outside the periphery, as shown in FIG. 3A, or from inside the periphery, as shown in FIG. 3B. Distal retention features 114C can be defined as wedge-shaped portions that are positioned so that an angled portion deflects tabs 114B when compressing plate 116 is pressed onto guide 114 until the wedge-shaped portion is received into the square openings, such as in a snap-fit type coupling. In such embodiments, the wedge-shaped portion can be dimensioned to extend beyond the square openings when guide 114 is snap-fit coupled to compressing plate 116 to allow a user to disassemble base portion assembly 110 by pressing on the portions of tabs 114B protruding from compressing plate 116.

In various embodiments, guide 114 can further include coupling features for securing base 112 to guide 114. As shown in FIG. 4, such coupling features can be defined as multiple tabs 114A distributed along the periphery of guide and extending towards base 112. Similar to the mechanism described above with respect to tabs 114B, tabs 114A are shaped so as to be resiliently received within corresponding retention features within base 112. In this embodiment, the corresponding retention features are also apertures 113A through which sealant is extruded. As can be seen in FIG. 4, tabs 114A are positioned to be received along an outside edge of each of apertures 113A and include distal retention feature 114D defined as a wedge-shaped portion that facilitates lateral deflection of tabs 114A until distal retention feature 14D is received along the lower edge of apertures 113. While in this embodiment, the corresponding features of base 112 are integrated with apertures 113A, it is appreciated that base 112 could include separate retention features, for example a series of openings similar to those in compressing plate 116.

In any of the embodiments herein, it is appreciated that one or more retention features, such as tabs 114A and 114B, can be used to secure the elements of base portion 110 within an assembly. Such retention features can be adapted to permanently secure the components together or to releasably secure the components together so as to allow an end-used to disassemble base portion if needed. While retention features 116B are shown as square or rectangular openings and tabs 114A and 114B are shown as having rectangular cross-sections, it is appreciated that various other shapes could be used in keeping with retention mechanisms described above.

As shown for example in FIG. 5, guide base 114 may include a set of openings 114E which overlap or match up with apertures 113A of base 112 so that flowable sealant flows through both openings 114E and base 113A when cartridge 115 is compressed. Guide 114 can further include a set of tabs 114A on the base-facing side that detachably couple guide base 114 to base 112. Also, as seen in FIG. 5, base assembly can further include reinforcing ring 118, which is a rigid ring adapted to fit around cartridge 115 when fitted within guide base 114. Reinforcing ring 118 is made of a suitable material and dimension to provide resistance to the lateral flow of sealant through the sidewall of cartridge 115 when cartridge 115 is compressed against base 112 otherwise known as a "blow-out." As seen here, reinforcing ring extends only partly along the side to allow cartridge to be compressed to about the height dimension of the reinforcing ring.

In such embodiments, guide base 114 may also include a set of upward-facing tabs 114B, that face away from base 112, that engage a compressing member such as compressing plate 116. In various embodiments, compressing plate 116 is a disc-shaped structure with a lip surrounding the outer edge that curves downward toward base 112. Compressing plate 116 may be made of a rigid material such as galvanized steel, stainless steel, aluminum, etc., that is strong enough to compress cartridge 115 without distorting.

In various embodiments, compressing plate can be formed in a shape having a convex top surface on a side facing away from the roof surface, which inhibits accumulation of rain and/or debris when mounted on the roof surface.

Compressing plate 116 may include one or more retention features (e.g. recesses, openings) positioned to match with location of tabs 114B formed on guide base 114 so that compressing plate 116 will remain mechanically coupled to the entire assembly, for ease of transport and installation. Housing of compressing plate 116 includes central opening 116A which is co-located with opening 115A in cartridge 115 and opening 112A in base 112.

FIGS. 6A-6C illustrate the process of mounting an exemplary base portion assembly 110 to a roof surface using a hanger bolt 121 as the mechanical fastener. Base assembly 110 is installed by first drilling a pilot hole into a roof surface, for example, directly through any existing shingles. After the pilot hole has been drilled, base assembly 110 may be positioned over the pilot hole, as shown in FIG. 6A and hanger bolt 121 inserted through aperture 116A in compressing plate 116, aperture 115A in cartridge 115, through guide base 114 and through aperture 112A in base 112, and into the pilot hole. Then, using an impact driver or other tool, torque is applied to hanger bolt 121 until head 121A engages the top surface of compressing plate 116, which in turn begins to crush cartridge 115. As torque is continuously applied, compressing plate 116 continued to crush cartridge 115 until the bottom of the lip of the outer periphery of compressing plate 116 rests against the top surface of base 112. Tabs 114A (not shown) can be deflected outward or break off as the compressing plate 116 moves downward.

During this torqueing process, sealant will be forced through the openings in the bottom of guide base 114, through apertures 113 in base 112 and underneath to seal around lag bolt 121 and any missed drill holes that are also within the void defined by base 112 and sealant ring 111.

Figure 7A:
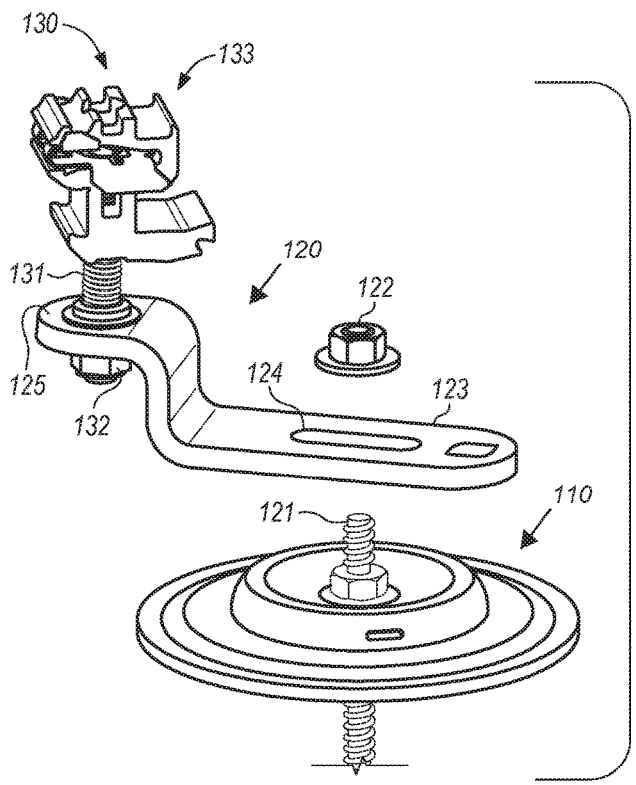
FIGS. 7A and 7B illustrate an exploded view and an assembled view, respectively, of a photovoltaic mounting system adapted to form a chemical flashing according to an exemplary embodiment.
Figure 7B:
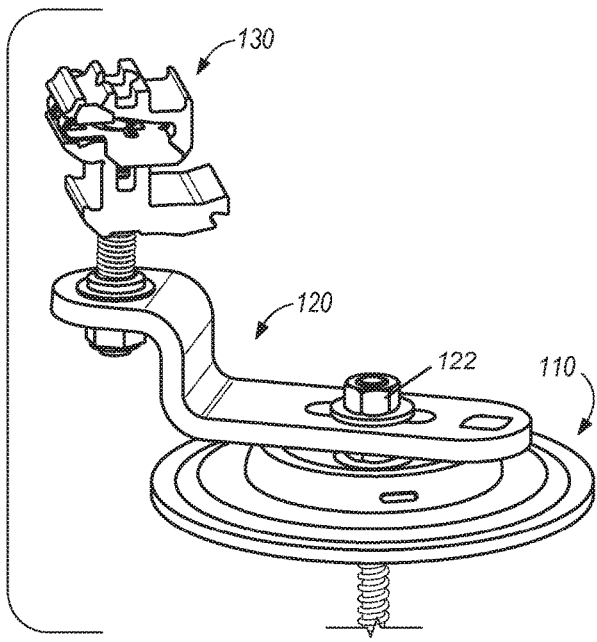

FIGS. 7A and 7B show an exploded view and an assembled view of a photovoltaic mounting bracket 120 and base assembly 110. In various embodiments, bracket 120 includes an opening, such as slot 124, through which the top of lag bolt 121 passes when assembled. Nut 122 rests against top surface 123 of bracket 120 so as to hold bracket 120 against base assembly 110. Slot 124 allows mounting bracket 120 to be rotated 360 degrees about lag bolt 121 as well as moved laterally along the primary axis of bracket 120. Such a configuration allows for adjustment of mounting bracket as needed for a position of a photovoltaic module mounted on the roof surface.

Bracket 120 can further include raised portion 125 that supports photovoltaic coupling device 130. An advantage of this design is that raised portion 125 provides extra clearance for mounting hardware supporting PV coupling device 130, such as, for example, nut 122. In various embodiments, PV coupling device 130 is supported above raised portion 125 by a threaded stud such as stud 131. An advantage of this is, is that adjustments can be made to the height of PV module coupling device 130 and base assembly 110 (and by extension between device 130 and the roof surface) to compensate for an uneven roof surface.

As shown in the figures, PV module coupling device 130 can include a rock-it connector such as connector 133 manufactured by SolarCity Corp. Such a coupling device is described and illustrated, for example, in commonly assigned U.S. patent application Ser. No. 14/615,320, Publication No. 2015/0155823-A1, the disclosure of which is herein incorporated by reference in its entirety. However, it should be appreciated that a clamping or wrap-around style connector, or other types of connectors, may be utilized with various embodiments with departing from the spirit or scope of the invention.

Referring now to FIGS. 8-14, these figures show a photovoltaic module mounting system adapted to form a chemical flashing according to another embodiment of the invention. System 200 employs a somewhat different photovoltaic mounting bracket, as shown in FIGS. 1-7, that still forms a chemical flashing that is released by the action of a hanger or lag bolt being torqued down to the roof to securely attach the base portion, in this case assembly 210, to the roof surface.

Figure 8:
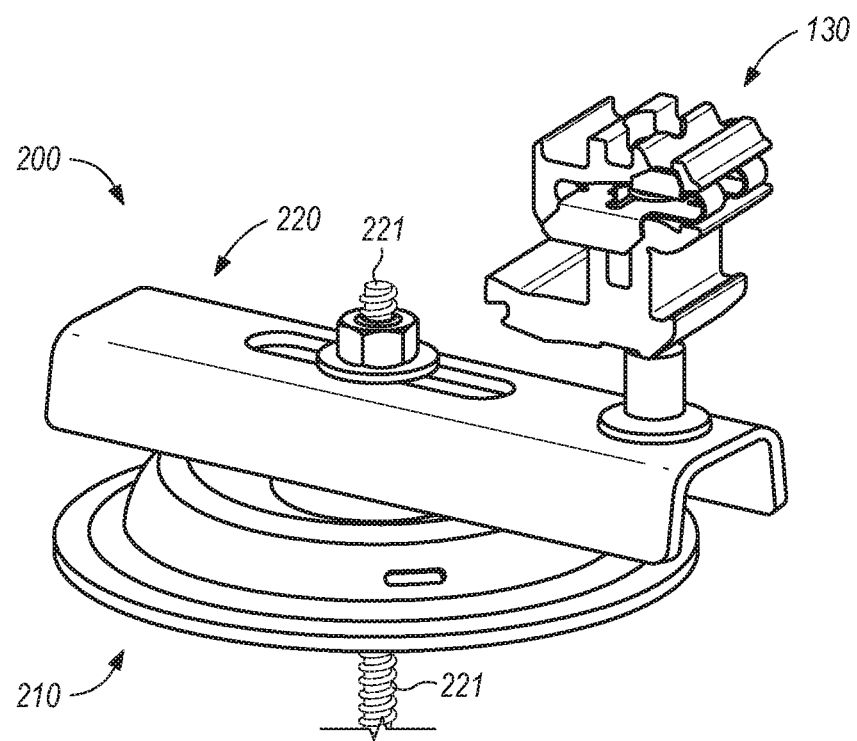
FIGS. 8 and 9 illustrate an assembled view and an exploded view, respectively, of a photovoltaic mounting system adapted to form a chemical flashing according to another exemplary embodiment.

As shown in FIG. 8, system 200 includes base assembly 210, mounting bracket 220 and PV module coupling device 130. Coupling device 130 is substantially the same as the coupling device shown in FIGS. 1-7. As in the case of that embodiment, system 200 may include a clamping or wrap-around coupling device in place of rock-it connector 130. Such variations are with in the spirit and scope of the invention.

Figure 9:
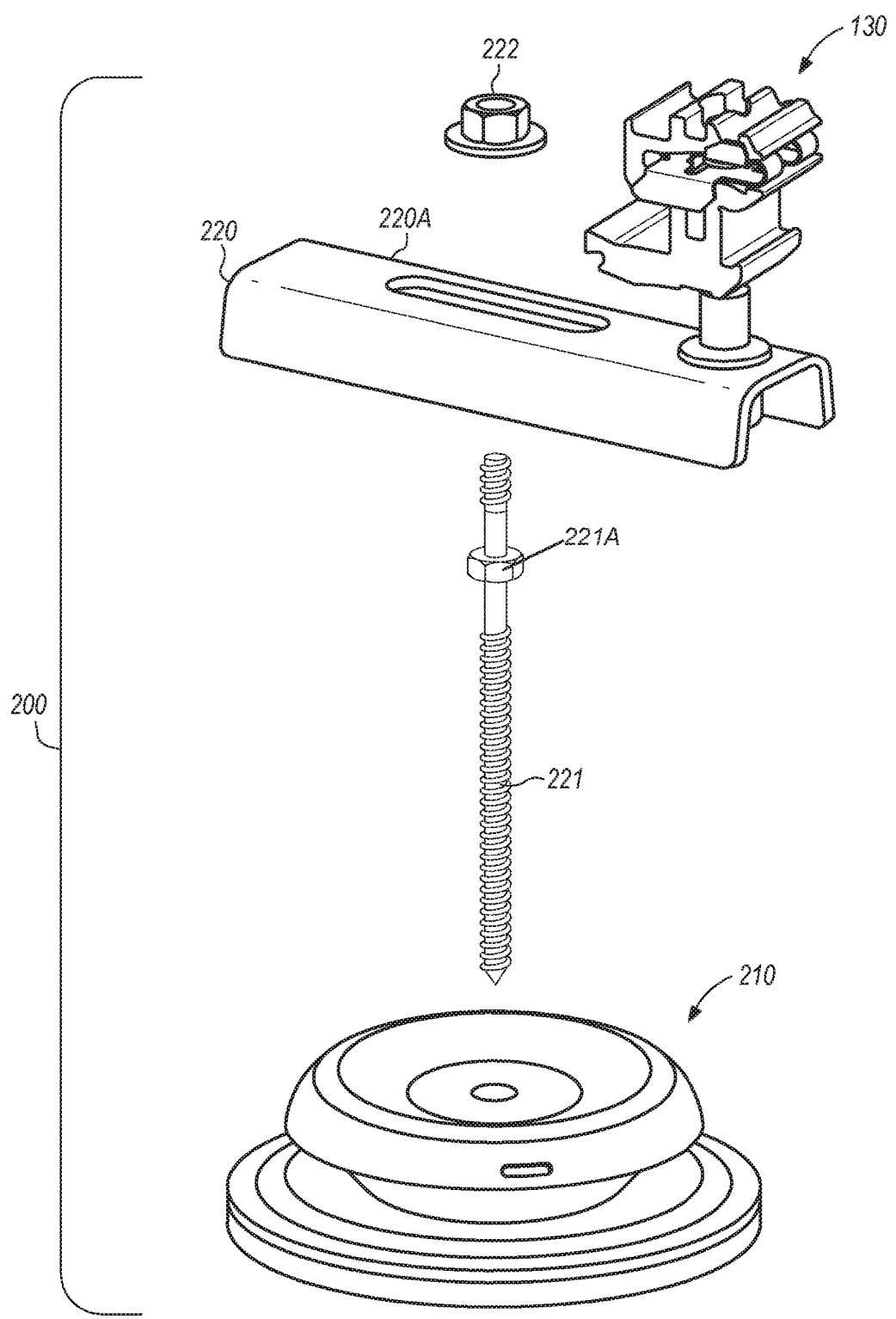

As can be understood by referring to the partly exploded view in FIG. 9, hanger bolt 221 is inserted through base assembly 210 to secure it to the roof surface. Then, mounting bracket or foot assembly 220 is placed on top of base assembly 210 via slot 220A. The top portion of hanger bolt 221 may pass through slot 220A and then receives nut 222, which is torqued down to fasten foot assembly 220 to base assembly 210. Slot 220A allows the location of PV module coupling device 130 to be moved with respect to hanger bolt 221, both laterally and rotationally. After mounting is complete, the system appears as shown in FIG. 8.

Figure 10:
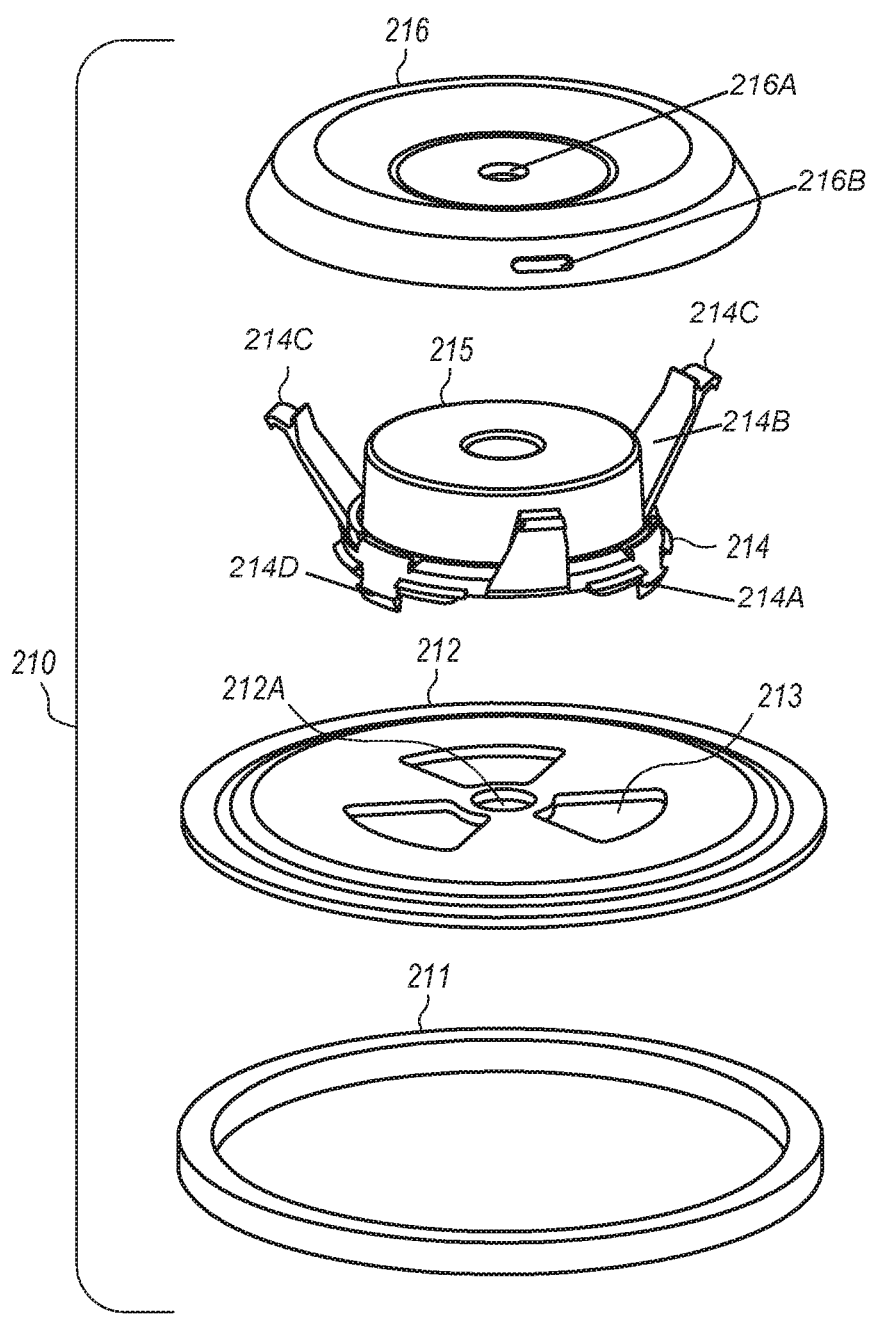
FIG. 10 illustrates an exploded view of a base assembly of the photovoltaic mounting system of FIG. 9.

FIG. 10 is a partially exploded view showing the individual components of base assembly 210, which include, assembled from bottom to top, sealant ring 211, base 212, sealant guide 214, sealant cartridge 215 and compressing plate 216. Each of these components of base assembly 210 and their relative position is described in further detail below.

Base 212 sits on top of sealant ring 211. Base 212 is preferably made of a rigid, corrosion resistant material, for example a metal alloy, such as steel, aluminum or hard plastic. Base 212 can further include a recess on its underside (e.g., roof-facing side) that is dimensioned to receive sealant ring 211, which helps prevent leakage of sealant out from the seam between ring 211 and base 212. Sealant ring 211 can be made of foam or other deformable material so as to define a perimeter under base assembly 210 that contains the flowable sealant as it is extruded through any apertures 212A in base 212. Sealant ring 211 can also define a cavity between the bottom of base 212 and the roof surface, which defines the space in which the chemical flashing is formed. Sealant ring can be releasably or fixedly attached to the underside of base 212 by any suitable means, for example a pressure-sensitive adhesive.

As shown, base 212 further includes one or more holes 212A for receiving a mechanical faster such as a lag bolt or hanger bolt. As shown, hole 212A is in the center, however, it should be appreciated that if more than one fastener is used, there may be multiple holes distributed around base 212. Base 212 further includes one or more apertures 213 for guiding flow of sealant material into the void defined by sealant ring 211, base 212 and the roof, and around the lag bolt or hanger bolt penetrating into the roof, thereby forming the chemical flashing around the roof penetration.

Next, in this assembly 210 is sealant cartridge 215 and sealant carrier or guide 214. Sealant guide 214 sits on base 212 and may include one or more coupling features, such as downward-facing tabs 214A with distal retention features 214D, which detachably couple guide 214 to base 212 by a mechanism the same or similar to that described in the embodiment of FIGS. 1-7. Guide 214 can further include one or more coupling features, such as upward-facing tabs 214B that serve to maintain the position of sealant cartridge 215 and also to connect it to compressing plate 216 by distal retention features 214B. Compressing plate 216 can include a set of corresponding retention features, such as openings 216A, that receive tabs retention features 214C of tabs 214B to keep assembly 210 together before installation. Such coupling features allows the base portion assembly 210 to remain as an assembly without any need for any additional fasteners, such as hangar bolt, extending therethrough. Though not shown in FIG. 10, sealant cartridge 215 and guide base 214 may also include a reinforcing ring, such as described previously. Such a reinforcing ring helps keep cartridge 215 seated on guide base 214 and to prevent against blow-outs when compressing plate 216 is compressed down towards base 212, thereby causing sealant to be dispensed through apertures 213 and under base 212 around bolt 221 and forming the chemical flashing.

Figure 11:
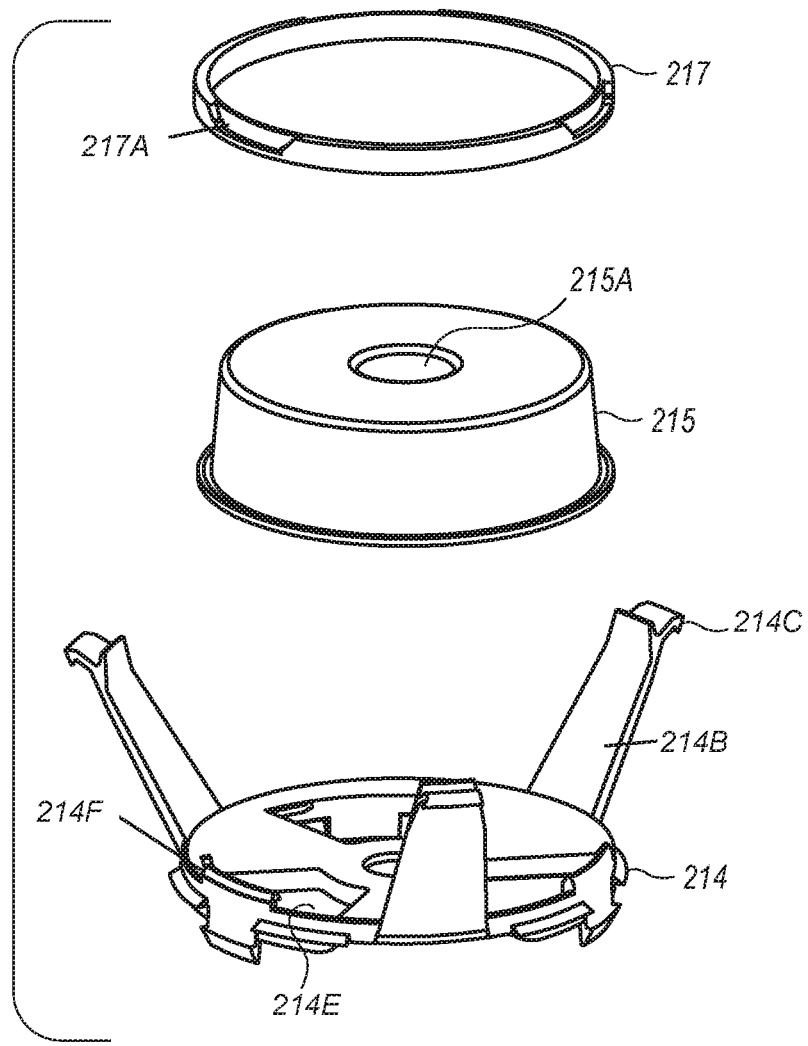
FIG. 11 illustrates select components of the base assembly of the photovoltaic mounting system of FIG. 9.

FIG. 11 shows another exemplary reinforcing ring 217. Reinforcing ring 17 is preferably though not necessarily short enough to allow compressing plate 216 to compress against base 212 without interfering but tall enough to substantially prevent blow outs. Ring 217 can further include orientating and/or coupling features, such as recesses 217A, which fit into corresponding protrusions 214E on guide 214. These features can be adapted to fit together in a snap-fit type coupling so as to secure retaining ring 217A with guide 214. Guide 214 further includes openings 214E that align with corresponding apertures 213 in base 212 through which sealant flows from sealant cartridge 215.

Figure 12A:
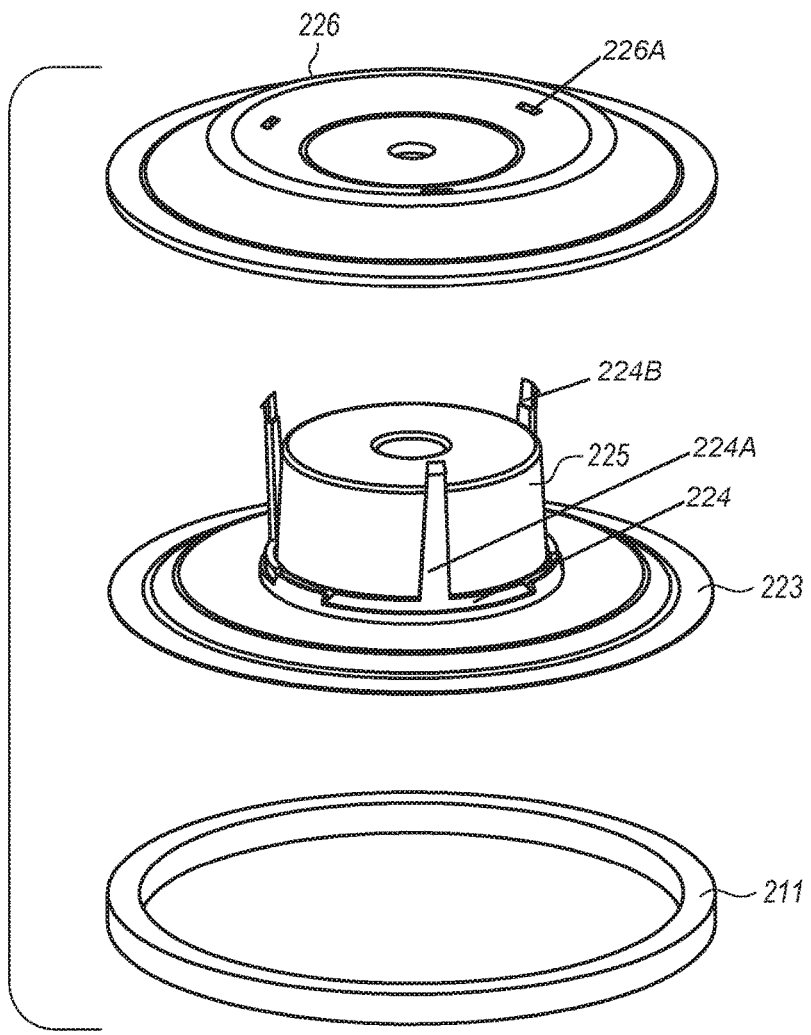
FIG. 12A illustrates an exploded view of a base assembly of a photovoltaic mounting system according to another exemplary embodiment.
Figure 12B:
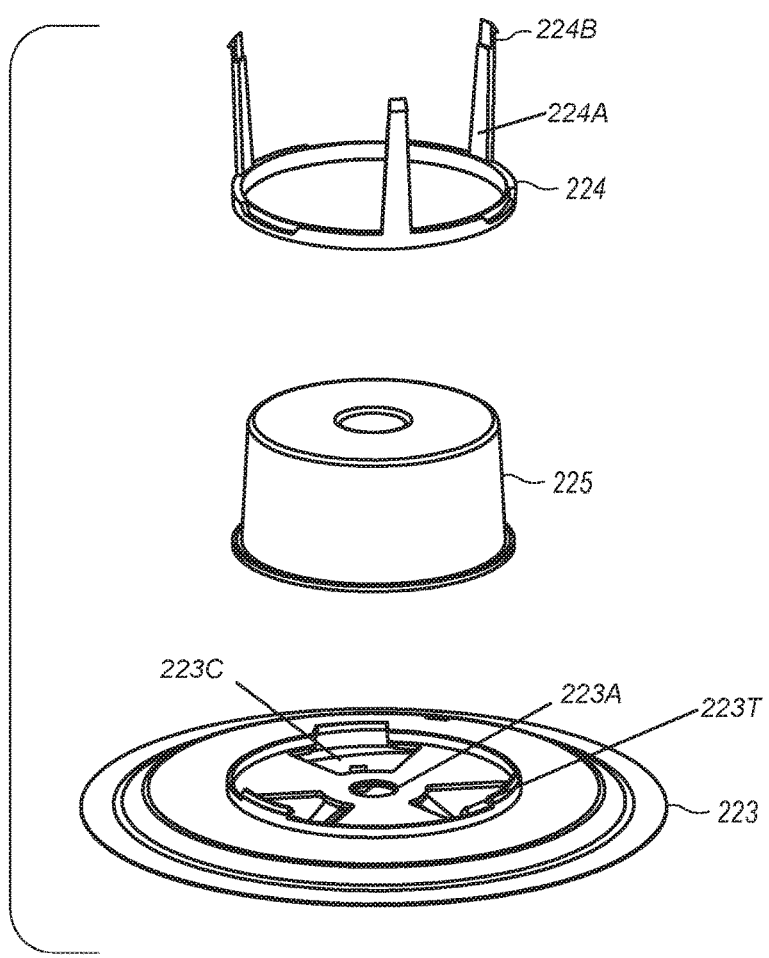
FIG. 12B illustrates an exploded view of a base assembly of a photovoltaic mounting system according to yet another exemplary embodiment.
Figure 13:
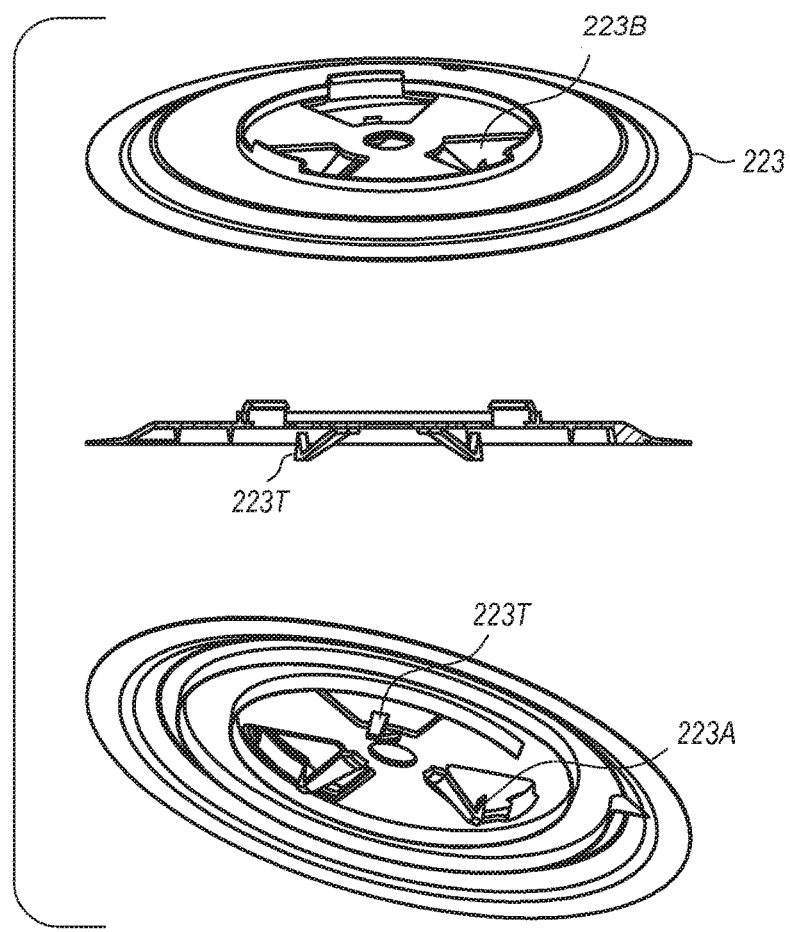
FIG. 13 illustrates several views of a base of the base assembly shown in FIG. 12B.

Turning now to FIGS. 12A and 12B, these figures show alternative embodiments of base assembly 210 in which guide 224 and base 223 are slightly different from guide 214 and base 212. Guide 224 includes a plurality of upward-facing tabs 224A with distal retention features 224A which engage corresponding retention features 226A in compressing plate 226. In this embodiment, compressing plate 226 has a larger diameter than compressing plate 216, and can be made larger than sealant ring 211 so that when compressing plate 226 is compressed against cartridge 225 and guide base 224, the outer periphery of compressing plate 226 extends further down such that it contacts ring 211 as well as the roof surface. In this embodiment, base 223 can be made out of plastic or other less durable material since most or all of base 223 may not be in the load path of the assembly 210, unlike base 212 previously described.

As shown in FIG. 12B, base 223 includes a central hole 223A for passage of the mechanical fastener and apertures 223B for passage of flowable sealant. Base 223 can further include one or more puncture tabs 223T within openings 223B for facilitating puncture of a bottom portion of sealant cartridge 225. Puncture tabs 223T are shown in more detail in FIG. 13. As shown, puncture tabs 22T include an inwardly projecting tab extending inwardly to an upward projecting barb that is elevated above base 223 when base 223 is set on the roof or other flat surface. Puncture tabs 223T assist in the rupturing of the seal of cartridge 225 when compressing plate 226 is lagged down towards base 223. Puncture tabs 223T can be located at the point of apertures 223B to further guide the flow of the sealant in cartridge 225 under base 223.

Figure 14A:
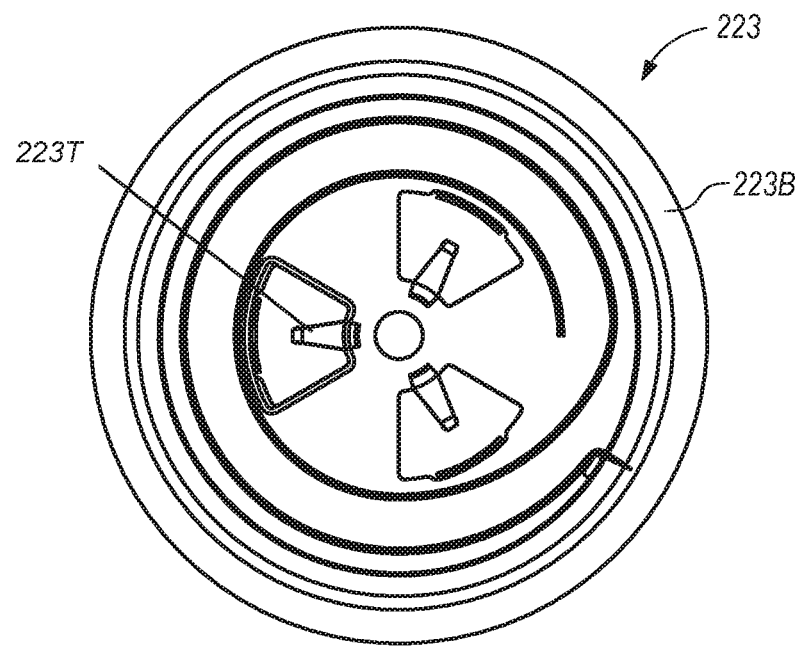
FIGS. 14A and 14B illustrate bases for use in a base assembly of a photovoltaic mounting system according to alternative embodiments.
Figure 14B:
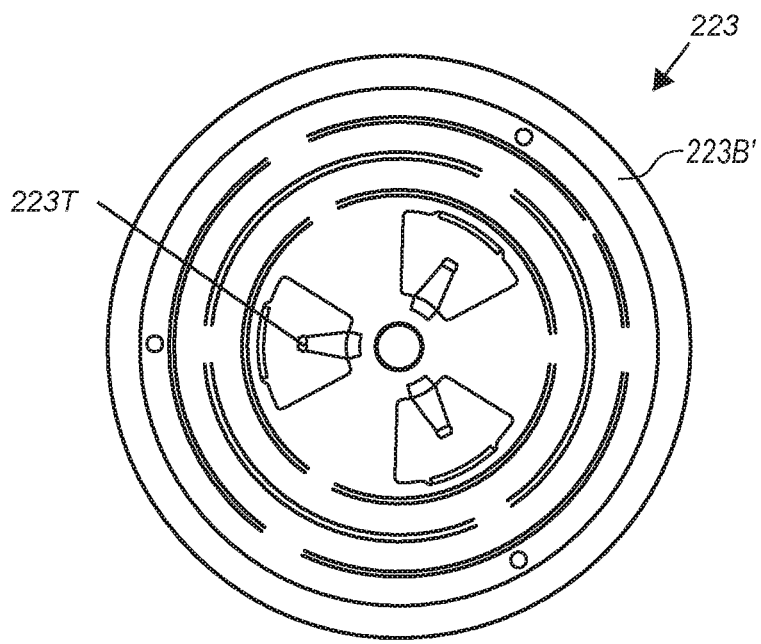

FIG. 14 illustrates two variations of the underside of base 223-223B, and 223B'—which may assist in directing and evenly distributing the flow of sealant material from cartridge 225 under base 223. Design 223B is a spiral design in which sealant material is guided outward spirally in an increasing large diameter path starting from the center. Design 223B' is a labyrinth design consisting of a series of partial rings in which sealant is simultaneously guided away from the center in three directions, converging around each ring before moving on to the next ring. These or other bottom designs may be utilized with the various embodiments of the invention. It is appreciated that base could include further variations that include channels or geometries that facilitate controlled flow of sealant through the base so as to form a consistent and uniform chemical flashing.

Referring back to FIGS. 8 and 9, mounting bracket assembly 220 may include a section of extrusion or roll formed steel that is somewhat longer than the diameter of base assembly 210. Bracket assembly 220 may have a downward U cross-sectional shape where the bottom of each side of the U rests on a ridge or flat surface formed in the top of compressing plate 216. It should be appreciated that this design is merely exemplary and other types of mounting brackets may be used with system 200 shown in these figures.

Referring now to FIGS. 15-21, these figures show a photovoltaic mounting system including a chemical flashing according to various embodiments of the invention. System 300 is similar to that shown in the previous embodiments in that it includes base assembly 310, mounting bracket 220 and photovoltaic module coupling device 130.

Figure 15:
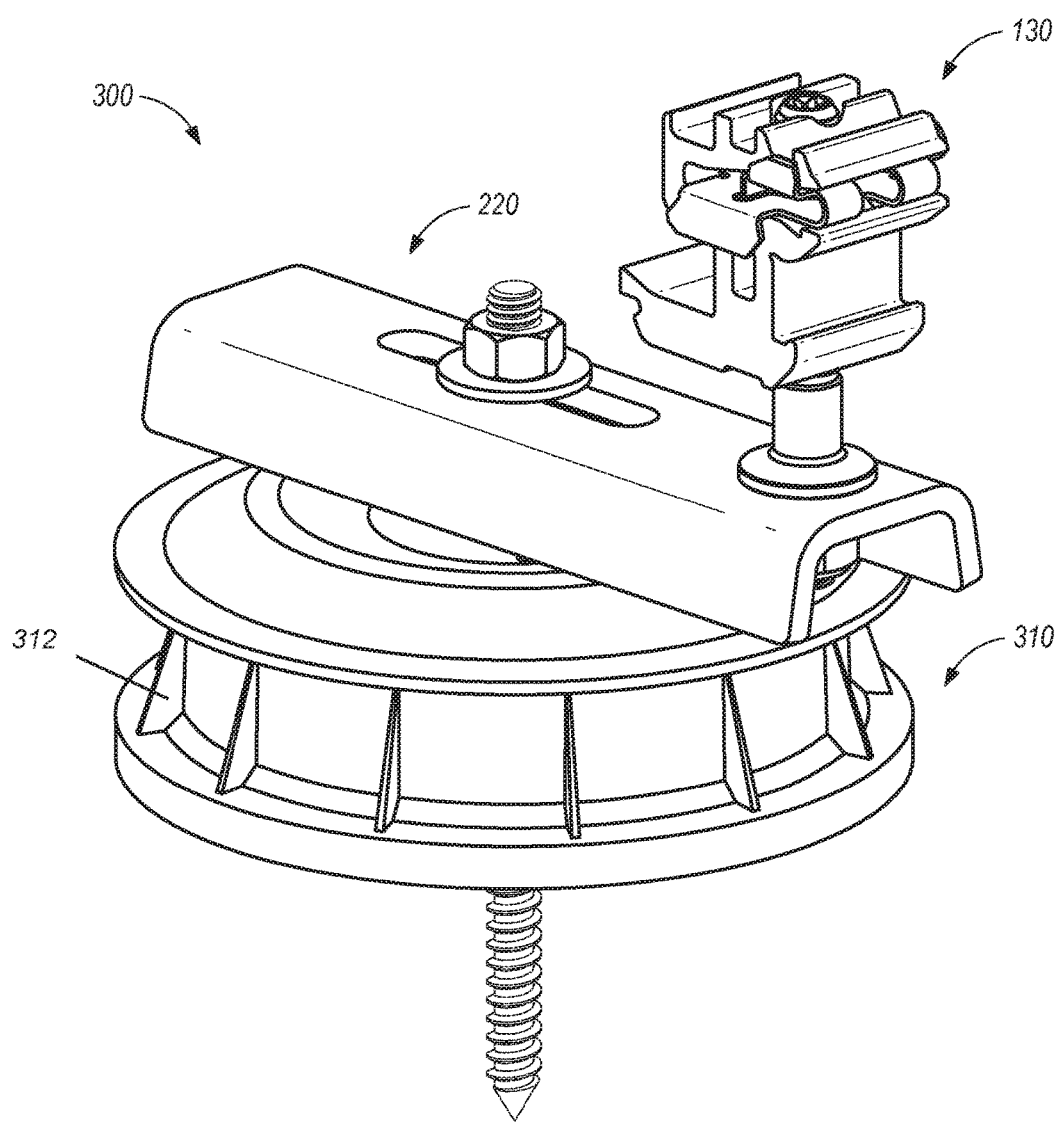
FIG. 15 illustrates a photovoltaic mounting system according to another exemplary embodiment.
Figure 16:
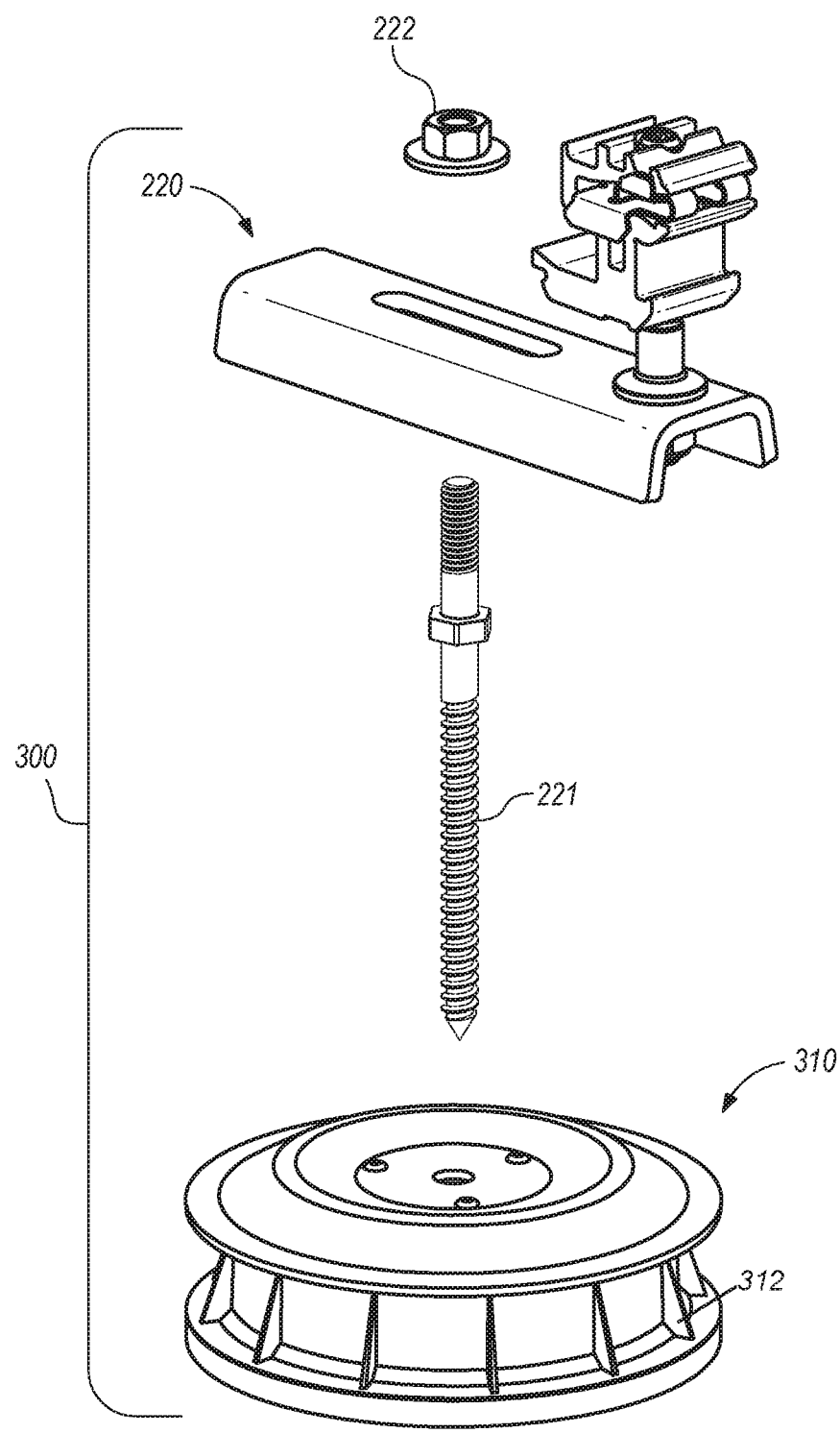
FIG. 16 illustrates an exploded view of the photovoltaic mounting system shown in FIG. 15.

One difference over previous embodiments, is that several of the components of base assembly 310 are combined or integrated into a single part. As can be seen in FIG. 15 and the exploded view in FIG. 16, however, the mounting system include an integrated base assembly 310 that is integrated into a single component. Typically, base assembly 310 is integrated such that it cannot be readily disassembled by an end-user.

Figure 17A:
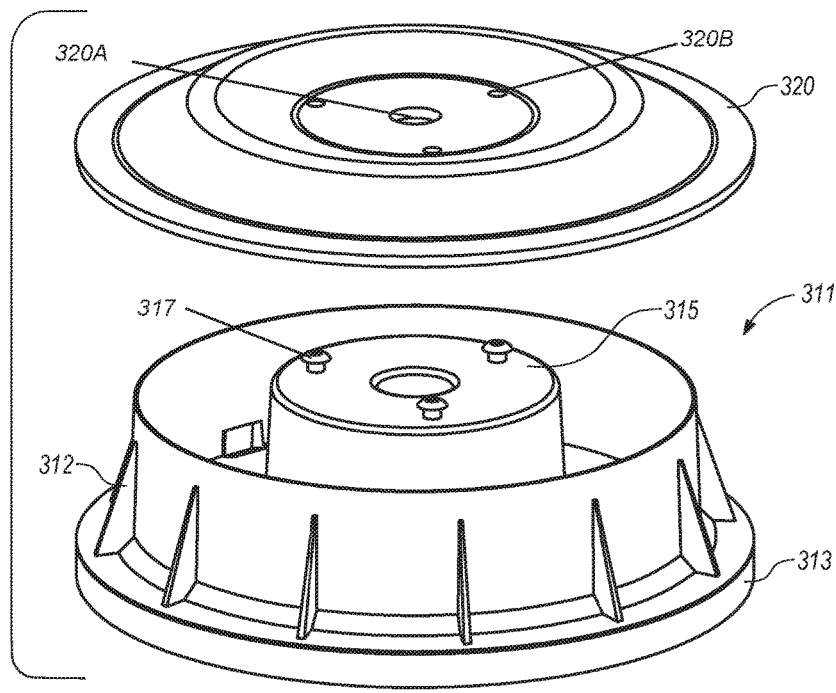
FIG. 17A illustrates an exploded view of the base assembly of the photovoltaic mounting system shown in FIG. 15.

A partly exploded view of integrated guide base 311 is shown in FIG. 17A. As can be seen, in addition to sealant ring 313, base assembly 311 includes an integrated guide 311 and sealant reservoir 315. In this embodiment, guide base 311 includes one or more gussets 312 to provide sufficient strength to maintain the integrity of the assembly prior to installation, yet allow directionally controlled collapse upon installation.

As shown, reservoir 315 includes a center hole 316 for allowing a lag bolt, hanger bolt, or other fastener to pass through. It is appreciated however, that reservoir could be formed in a shape that would not require a central hole or could be formed of a material that would allow the mechanical fastener to puncture the reservoir when inserted therethrough. In some embodiments, reservoir 315 of guide base 311 may include seal of foil or other material on its underside to protect the sealant from the air while still allowing for easy penetration during installation.

Figure 17B:
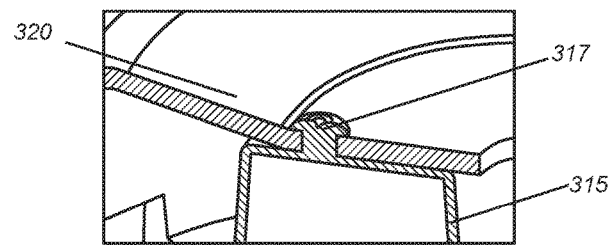
FIG. 17B illustrates a detailed view of the pins of the sealant reservoir heat bonded to corresponding holes in compressing plate of the base assembly in FIG. 17A.

Reservoir 315 can be attached to compressing plate 320 by any suitable means. In the depicted embodiment, reservoir 315 include one more pins 317 for attaching and orienting guide 311 to compressing plate 320. As shown in FIG. 17, compressing plate 320 may be attached to base assembly 310 by pins 317 on the top surface of reservoir 315 which pass through reciprocal holes 320B formed in compressing plate 320, which also includes a central hole 320A for passage of the mechanical fastener. Reservoir can then be secured through a process such as heat staking or ultrasonic bonding, thereby affixing pins 317 and compressing plate 320 to one another, as depicted in the detail cross-section shown at bottom of FIG. 17.

Figure 18:
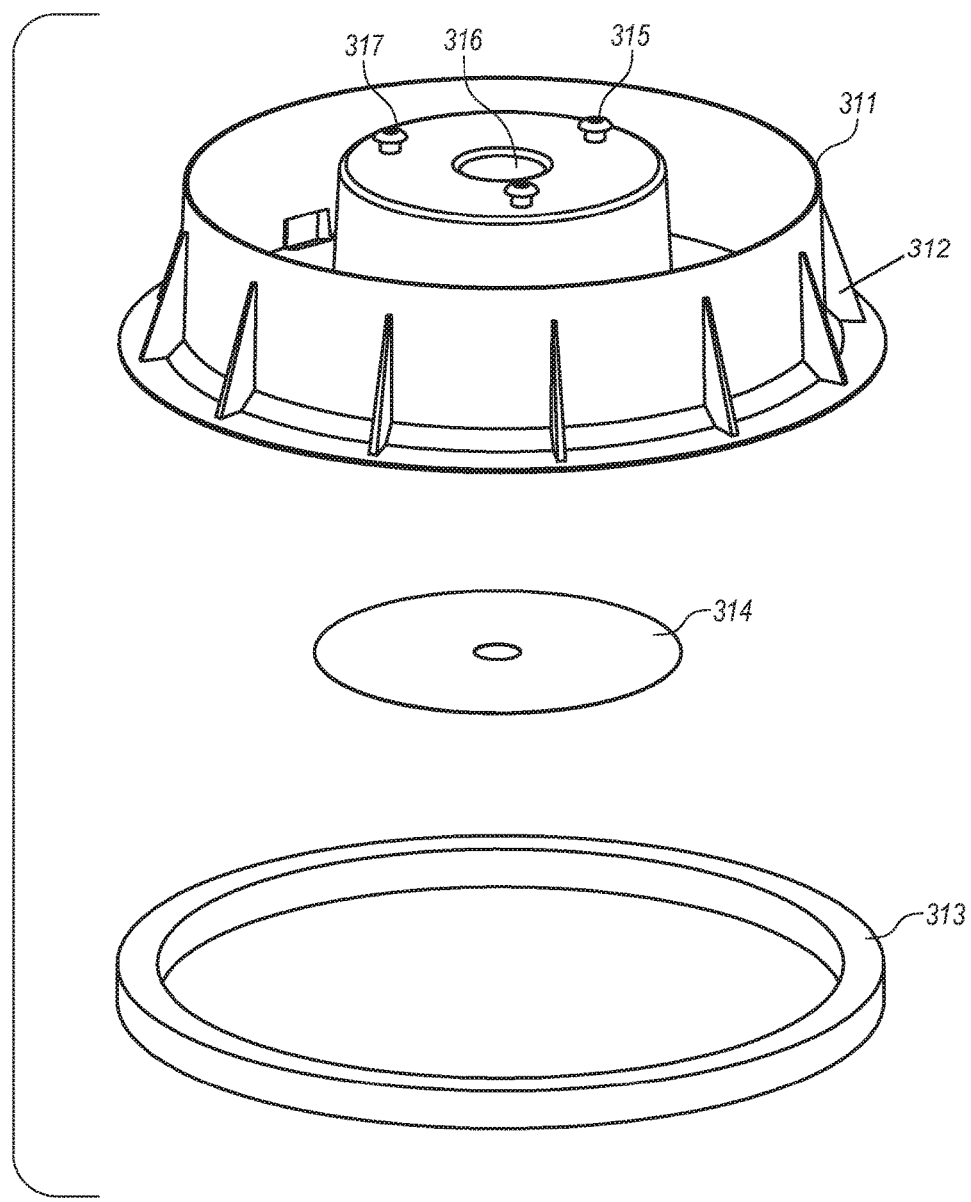
FIG. 18 illustrates an exploded view of the base assembly components according to another embodiment of a photovoltaic mounting system.
Figure 19:
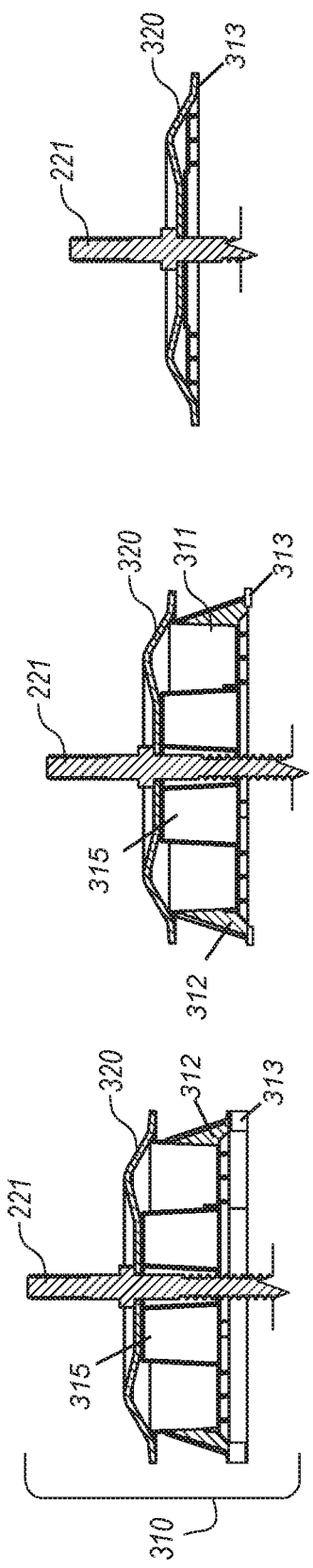
FIGS. 19A-19C illustrate sequential cross-sectional views of an exemplary photovoltaic mounting system before, during and after installation according to various embodiments.

In various embodiments, the underside of reservoir 315 includes a void in which sealant is placed prior to sealing with foil seal 314 underneath that is surrounded by sealant ring 313, as can be understood by referring to FIG. 18. Also, guide base 311 can include multiple gussets 312 to assist in uniform deformation of ring 313 during installation. Typically, gussets 312 are defined as tapered reinforcing ribs that are distributed along an outer wall of the integrated guide base 311. In various embodiments, the top of reservoir 315 may project higher than the walls of guide base 311 so that reservoir 315 is at least partially compressed by compressing plate 320 before compressing plate 320 engages the top of the remainder of guide base 311. Installation of system 300 is similar to that shown in other embodiments. A hanger bolt, lag bolt or other fastener is driven into the roof through base assembly 310. Compressing plate 320 first engages the top of reservoir 315 of guide base 311 and then the top edge of base 311. Continued torqueing of fastener 221 eventually causes compressing plate 320 to compress reservoir 315 and guide base 311 until reservoir 315 is fully compressed.

An example of such a configuration is shown in FIG. 19A-C, which illustrates sequential cross-sectional views before, during and after mounting into the roof surface, respectively. In FIG. 19A, the top of reservoir 315 can be seen extending above the walls of guide 315. In FIG. 19B, compressing plate 320 has partly compressed reservoir 215 and abutted against the top of the walls of guide 215. In FIG. 19C, compressing plate 320 has been torqued into the roof surface to entirely compress reservoir 315 and abut against sealant ring 313 and roof surface, thereby extruding the flowable sealant into the space between the base and roof surface to form a chemical flashing along where the bolt 221 penetrates the roof surface.

Figure 20:
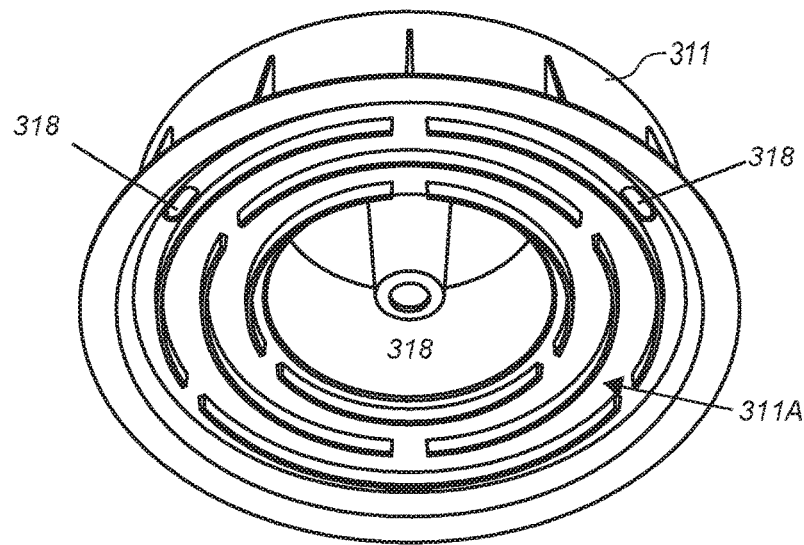
FIG. 20 illustrates an underside view of an integrated guide base according to another embodiment of a photovoltaic mounting system.
Figure 21A:
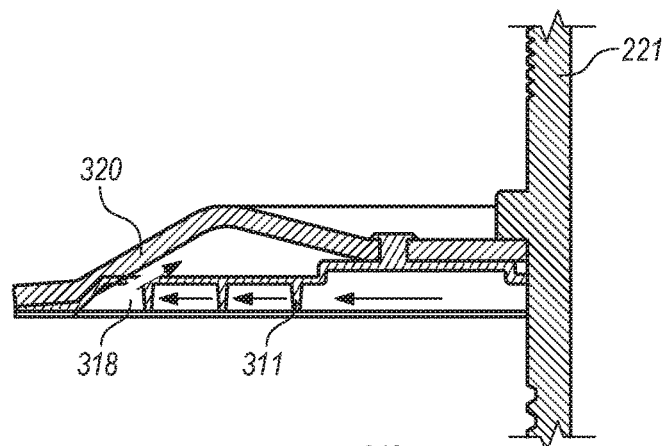
FIGS. 21A and 21B illustrate a cross-sectional detailed and an underside view, respectively, of the integrated guide base in FIG. 20 indicating a sealant flow path during installation according to various embodiments.
Figure 21B:
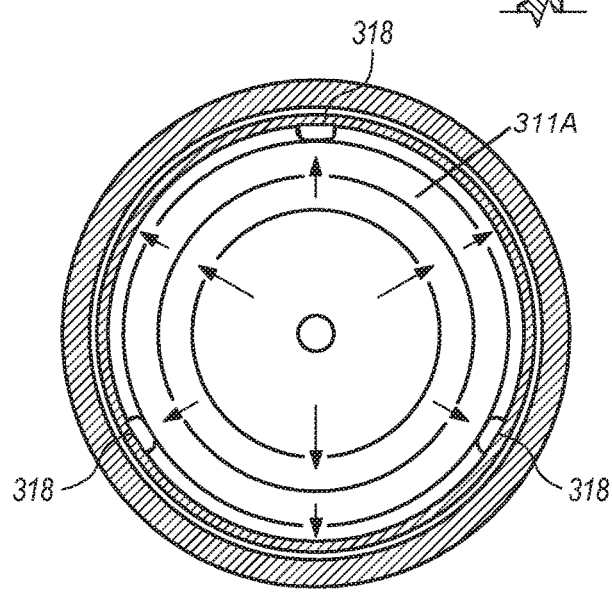
Figure 22:
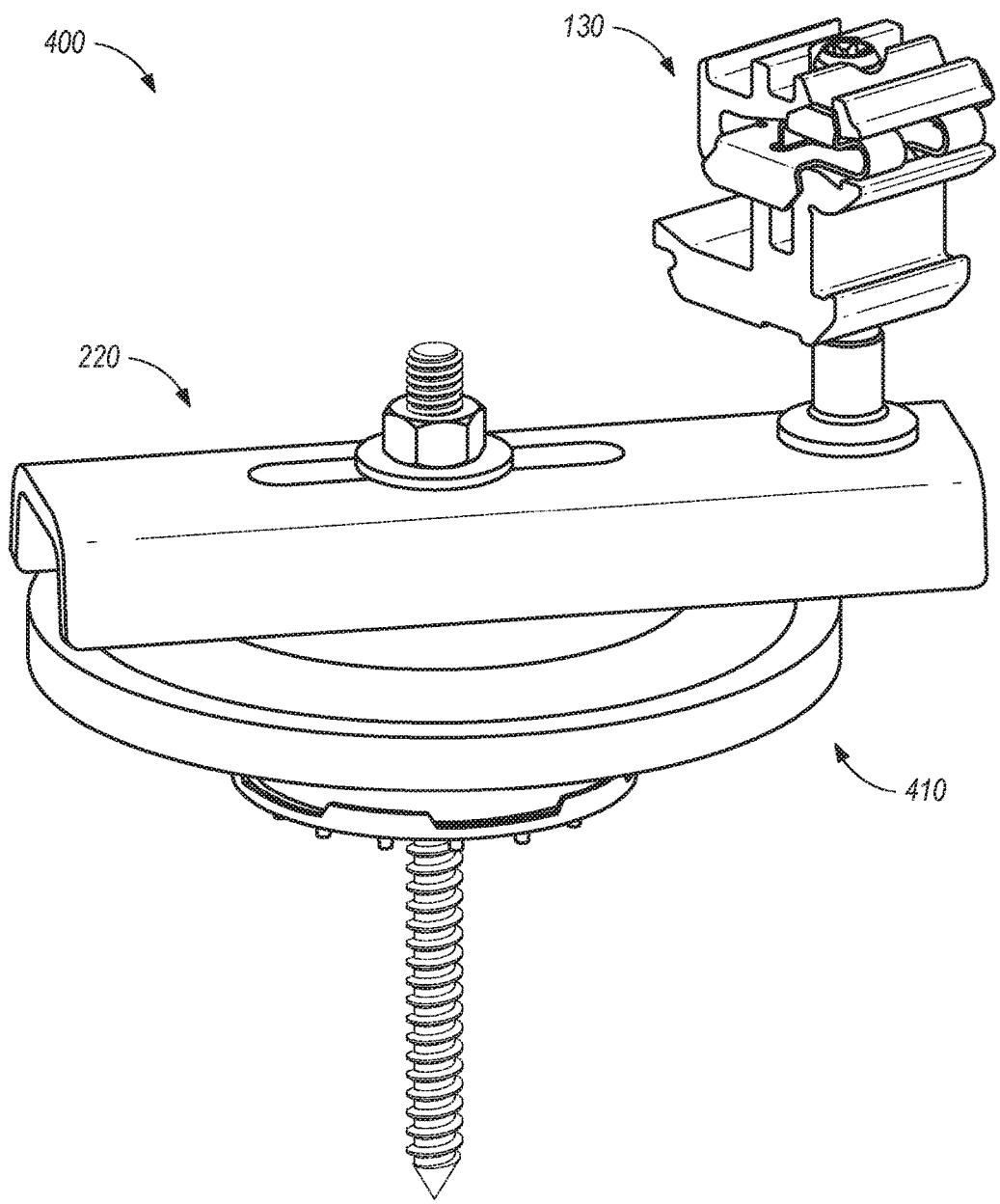
FIG. 22 illustrates a photovoltaic mounting system according to another exemplary embodiment.
Figure 23:
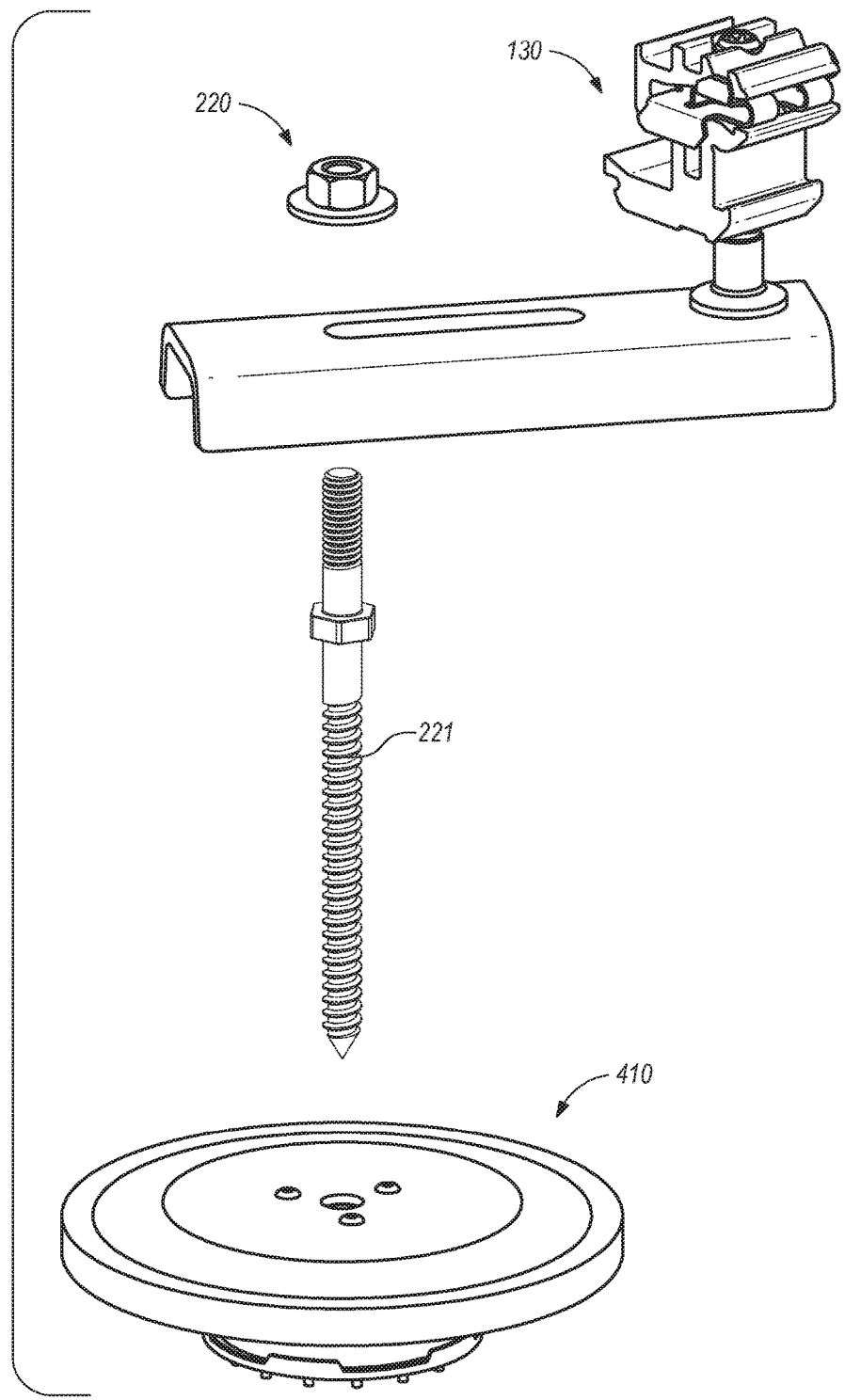
FIG. 23 illustrates an exploded view of the photovoltaic mounting system of FIG. 22.
Figure 24A:
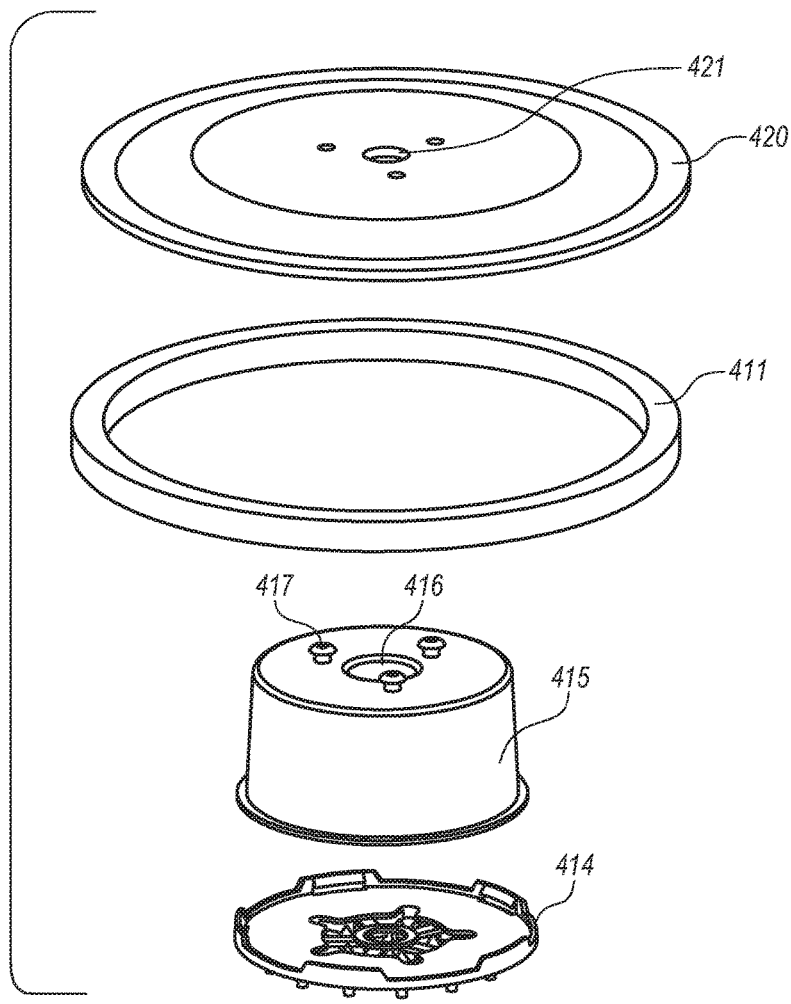
FIG. 24A illustrates an exploded view of the base assembly of the photovoltaic mounting system of FIG. 22.
Figure 24B:
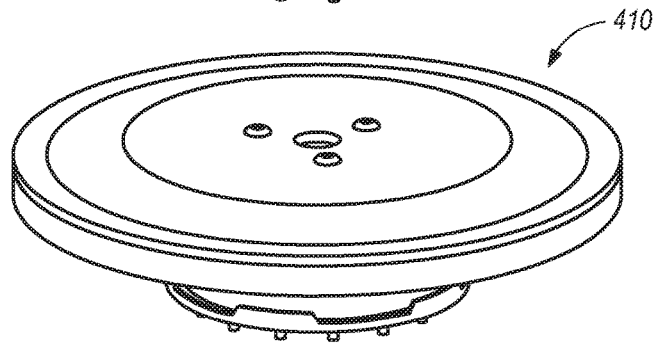
FIG. 24B illustrates an assembled view of the base assembly of the photovoltaic mounting system of FIG. 22.

As shown in FIGS. 20 and 21A-21B, guide base 311 can further include one or more vents 318 that allow sealant to flow back up under housing 320 rather than being forced out of the sides around ring 313. These vents 318 helps prevent any excess sealant from flowing onto the roof surface. The guide base 311 can further include the labyrinth of open channels that facilitate controlled flow of sealant between guide base 311 and the roof surface.

FIG. 20 shows a detailed view of the underside of guide base 311. In various embodiments, this may include a chamber or void centered on a lag or hanger bolt opening. In addition, there may be a labyrinth 311A or other pattern or network of open channels to further guide the flow of sealant under guide base 311, eventually reaching vent holes 318 which can direct excess sealant back under compressing plate 320 to help prevent blow-outs through the side of ring 313. FIG. 21A shows a detailed cross-sectional view of the sealant flow path (indicated by arrows) as the sealant flow through the labyrinth of channels and excess sealant flows through vent opening 318 into a space between guide base 311 and bell-shaped compressing plate 320. FIG. 21B shows an underside detailed view indicating a sealant flow path through the labyrinth of channels 311A towards vent openings 318 towards the outer periphery of guide base 311.

Referring now to FIGS. 22-26, these figures illustrate a photovoltaic mounting system adapted to form a chemical flashing according to yet another embodiment of the invention. As shown in the assembled view of FIG. 22 and can be understood further in the exploded view of FIG. 23, system 400 includes base assembly 410, mounting bracket 220, and photovoltaic module coupling device 130. Elements 220 and 130 are substantially the same or similar to those shown in previous embodiments, such that any previous detailed description can apply also to this embodiment. Base assembly 410 includes compressing plate 420, sealing ring 411, sealant cartridge 415 and an integrated guide base 414 that acts as both as a guide for supporting the sealant cartridge as well as a base for placing against the roof surface. An exploded view of base assembly 410 can be seen in FIG. 24A and an assembled view is shown in FIG. 24B.

FIGS. 25A-25B and 26 show integrated guide base 414 in greater detail, FIG. 25A illustrating a top side perspective view, FIG. 25B illustrated a bottom roof-facing side perspective view and FIG. 26 illustrating a cross-sectional side view. Guide base 414 includes substantially planar front surface 414F and bottom, roof-facing surface 414B. As shown, roof-facing surface 414B includes multiple columns or legs 414L that support assembly 414 and maintain a space during installation in which sealant can flow freely around the hanger bolt and under guide base 414. Guide base 414 also includes an a central opening 414A for passage of the fastener, such as a hanger bolt or lag bolt, while allowing contact with the sealant material. A continuous aperture 414C surrounds the central opening 414A to allow flowable sealant to flow continuously about the fastener so that the chemical flashing forms is sealed around the mechanical fastener. One or more puncturing tabs 414T can be included to quickly and evenly rupture any seal on the bottom side of sealant cartridge 415 when sealant cartridge 415 is compressed against guide 414 during installation. As can be seen in FIG. 26, the bottom of puncture tabs 414T extend below the bottom of the spacer columns 414L such that when guide base 414 is pressed against the roof surface, puncture tabs 414T are pivoted upwards thereby puncturing a breakable seal on the bottom, roof-facing side of sealant cartridge 415. Guide base 414 may also include one or more vertical tabs around its perimeter and/or coupling features 414G that interface with an outer lip along the bottom of sealant cartridge 415 to hold sealant cartridge 415 in place both during transit and installation. It is appreciated that any of the above described features can be used separately from the other features described or can be incorporated into any of the other embodiments described herein.

As with sealant cartridge 315, sealant cartridge 415 may include center hole 416 and multiple pins 417 that can mate with reciprocal openings in compressing plate 420 and can be attached by various means, such as heat staking or another suitable bonding process. These features enable base assembly 410 to be shipped as a single integrated product. Sealant ring 411 may be adhered to the under side (e.g., roof-facing side) of compressing plate 420 using glue or other adhesive so that when compressing plate is compressed toward the roof during installation, sealant ring 411 creates a perimeter around guide base 414 to contain the flow of sealant under base assembly 410.

The embodiments of the present inventions are not to be limited in scope by the specific embodiments described herein. For example, although many of the embodiments disclosed herein have been described with reference to composite shingle roofs, the principles herein may be equally applicable to other types of roofs. Indeed, various modifications of the embodiments of the present inventions, in addition to those described herein, will be apparent to those of ordinary skill in the art from the foregoing description and accompanying drawings and claims. Thus, such modifications are intended to fall within the scope of this invention. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, this disclosure should be construed in view of the full breath and spirit of the embodiments of the present inventions as disclosed herein and claimed below.

What is claimed is:

1. A photovoltaic mounting system for mounting on a roof surface, the system comprising:
   a base assembly adapted to couple with and support a mounting bracket supporting a photovoltaic module coupling device, wherein the base assembly includes a through-hole for insertion of a mechanical fastener and further comprises:
   a sealant cartridge containing a flowable sealant sealed therein,
   a compressing plate;
   a sealant guide that includes a first set of coupling features that releasably couple with the cartridge or the compressing member plate so as to hold the base assembly together via the first set of coupling features,
   wherein the sealant cartridge is held between the sealant guide and the compressing member within the base assembly,
   wherein the first set of coupling features comprises a plurality of tabs extending from or near an outer periphery of the sealant guide towards the compressing plate and adapted to releasably engage with an outer periphery of the compressing plate so as to maintain the sealant cartridge between the sealant guide and the compressing plate.

2. The photovoltaic mounting system of claim 1, wherein the compressing plate includes a one or more openings along the periphery thereof that are arranged so as to receive a distal retention feature of each of the plurality of tabs.

3. The photovoltaic mounting system of claim 1, wherein the compressing plate has a convex outer surface facing away from the sealant guide so as to inhibit accumulation of rain and/or debris when mounted on the roof surface.

4. The photovoltaic mounting system of claim 1, wherein each of the plurality of tabs of the first set includes a release feature on a distal end thereof to facilitate manual release of the compressing member by pressing against the release features of the plurality of tabs.

5. The photovoltaic mounting system of claim 1, wherein the base assembly further comprises:
   a base adapted to releasably couple to the sealant guide by a second set of coupling features of the sealant guide.

6. The photovoltaic mounting system of claim 5, wherein the base has an underside recess on a roof-facing side so as to define a space between the base and the roof when mounted thereon for flowable sealant to fill so as to form the chemical flashing.

7. The photovoltaic mounting system of claim 1, wherein the cartridge comprises a breakable seal on a roof facing side so as to facilitate directionally controlled release of flowable sealant through the seal upon fastening of the base assembly onto the roof.

8. The photovoltaic mounting system of claim 7, wherein one or more barbs extend from the sealant guide or an attached base, the one or more barbs being directed towards the breakable seal so as to facilitate breaking of the seal upon fastening of the base assembly to the roof surface.

9. A photovoltaic mounting system for mounting on a roof surface, the system comprising:
- a base assembly adapted to couple with and support a mounting bracket supporting a photovoltaic module coupling device, wherein the base assembly includes a through-hole for insertion of a mechanical fastener and further comprises:
- a sealant cartridge containing a flowable sealant sealed therein,
- a compressing plate;
- a sealant guide that includes a first set of coupling features that releasably couple with the cartridge or the compressing member plate so as to hold the base assembly together via the first set of coupling features,
- wherein the sealant cartridge is held between the sealant guide and the compressing member within the base assembly,
- wherein the sealant guide includes a central hole for passage of the mechanical fastener therethrough and a series of apertures distributed radially about the central hole so as to facilitate uniform distribution of flowable sealant around any roof surface penetration through which the mechanical fastener extends when mounted on the roof surface.

10. The photovoltaic mounting system of claim 9, wherein the base includes a central hole for passage of the mechanical fastener therethrough and a plurality of openings distributed about the central hole that are aligned with the plurality of apertures in the sealant guide when mounted on the roof surface.

11. The photovoltaic mounting system of claim 10, wherein the second set of coupling features comprises a plurality of tabs extending towards the base, each of the plurality of tabs having a distal retention feature adapted to engage an edge of the plurality of openings in the base.

12. The photovoltaic mounting system of claim 11, wherein the retention feature comprises an outwardly extending wedge shaped portion positioned to facilitate lateral deflection of the plurality of tabs upon pressing of the guide against the base and provide a snap-fit coupling between the guide and the base.

13. A photovoltaic mounting system for mounting to a roof surface, the system comprising:
- a base assembly adapted to couple with and support a mounting bracket supporting a photovoltaic module coupling device, wherein the base assembly includes a through-hole for insertion of a mechanical fastener and further comprises:
- a base,
- a compressing member,
- a sealant guide having first set of coupling features adapted to releasably couple with the compressing member, and
- a sealant cartridge having a sealant reservoir containing a flowable sealant sealed therein,
- wherein the sealant cartridge is fittingly received within the sealant guide and held between the sealant guide and the compressing member within the base assembly by the first set of coupling features,
- wherein the first set of coupling features include a plurality of protrusions fittingly received within corresponding openings in the compressing member.

14. The photovoltaic mounting system of claim 13, wherein the plurality of protrusions comprises a plurality of tabs, each of the plurality of tabs of the first set includes a release feature on a distal end thereof to facilitate manual release of the compressing member by pressing against the release features of the plurality of tabs.

15. The photovoltaic mounting system of claim 13, wherein the sealant guide, sealant reservoir and base are integrated within a single component having ribs or gussets that provide sufficient support to maintain the sealant sealed within the sealant reservoir prior to installation yet allow directionally controlled collapse of the reservoir when the base assembly is fastened to the roof surface during installation.

16. The photovoltaic mounting system of claim 13, wherein the base assembly further includes:
- a reinforcing ring adapted to fittingly receive the sealant cartridge and provide reinforcement against blow-out of sealant through a side-wall of the sealant cartridge.

* * * * *